(12) United States Patent
Sun et al.

(10) Patent No.: US 11,676,245 B2
(45) Date of Patent: Jun. 13, 2023

(54) INFORMATION PROCESSING APPARATUS AND METHOD FOR PROCESSING INFORMATION

(71) Applicants: SONY CORPORATION, Tokyo (JP); Masayoshi Doshida, Tokyo (JP)

(72) Inventors: Legong Sun, Tokyo (JP); Yasutaka Hirasawa, Tokyo (JP); Yuhi Kondo, Tokyo (JP); Ying Lu, Tokyo (JP); Tuo Zhuang, Tokyo (JP)

(73) Assignee: SONY CORPORATION, Tokyo (JP)

( * ) Notice: Subject to any disclaimer, the term of this patent is extended or adjusted under 35 U.S.C. 154(b) by 298 days.

(21) Appl. No.: 17/056,550

(22) PCT Filed: Feb. 18, 2019

(86) PCT No.: PCT/JP2019/005777
§ 371 (c)(1),
(2) Date: Nov. 18, 2020

(87) PCT Pub. No.: WO2019/225080
PCT Pub. Date: Nov. 28, 2019

(65) Prior Publication Data
US 2021/0374906 A1    Dec. 2, 2021

(30) Foreign Application Priority Data
May 24, 2018    (JP) .............................. JP2018-099440

(51) Int. Cl.
*G06T 3/40*    (2006.01)
*G06T 7/60*    (2017.01)
*G06T 7/90*    (2017.01)

(52) U.S. Cl.
CPC .............. *G06T 3/4015* (2013.01); *G06T 7/60* (2013.01); *G06T 7/90* (2017.01)

(58) Field of Classification Search
CPC ............ G06T 3/4015; G06T 7/60; G06T 7/90
See application file for complete search history.

(56) References Cited

U.S. PATENT DOCUMENTS

| 2012/0206581 A1 * | 8/2012 | Kanamori | .............. H04N 23/74 |
| | | | 348/370 |
| 2016/0261844 A1 * | 9/2016 | Kadambi | ................ G06T 7/507 |

(Continued)

FOREIGN PATENT DOCUMENTS

| CN | 102356628 A  *  2/2012 | ............... G06T 1/00 |
| CN | 105814401 A  *  7/2016 | ............. G01B 11/24 |

(Continued)

OTHER PUBLICATIONS

Miyazaki et al. ("Polarization-based transparent surface modeling from two views," Proceedings Ninth IEEE International Conference on Computer Vision; Date of Conference: Oct. 13-16, 2003) (Year: 2003).*

(Continued)

*Primary Examiner* — Yubin Hung
(74) *Attorney, Agent, or Firm* — Chip Law Group

(57) ABSTRACT

A normal candidate information generation unit of an information processor generates normal candidate information for each pixel indicating, for example, a zenith angle, or an azimuth angle, or a zenith angle and an azimuth angle, on the basis of a polarization image in a plurality of polarization directions obtained by a polarization imaging unit. The in-plane pixel selection unit selects a plurality of pixels indicating the plane to be observed in the polarization image. A normal calculation unit calculates a normal of the plane to be observed on the basis of the normal candidate information of the pixels selected by the in-plane pixel selection unit.

14 Claims, 20 Drawing Sheets

(56) References Cited

U.S. PATENT DOCUMENTS

Figure 1:
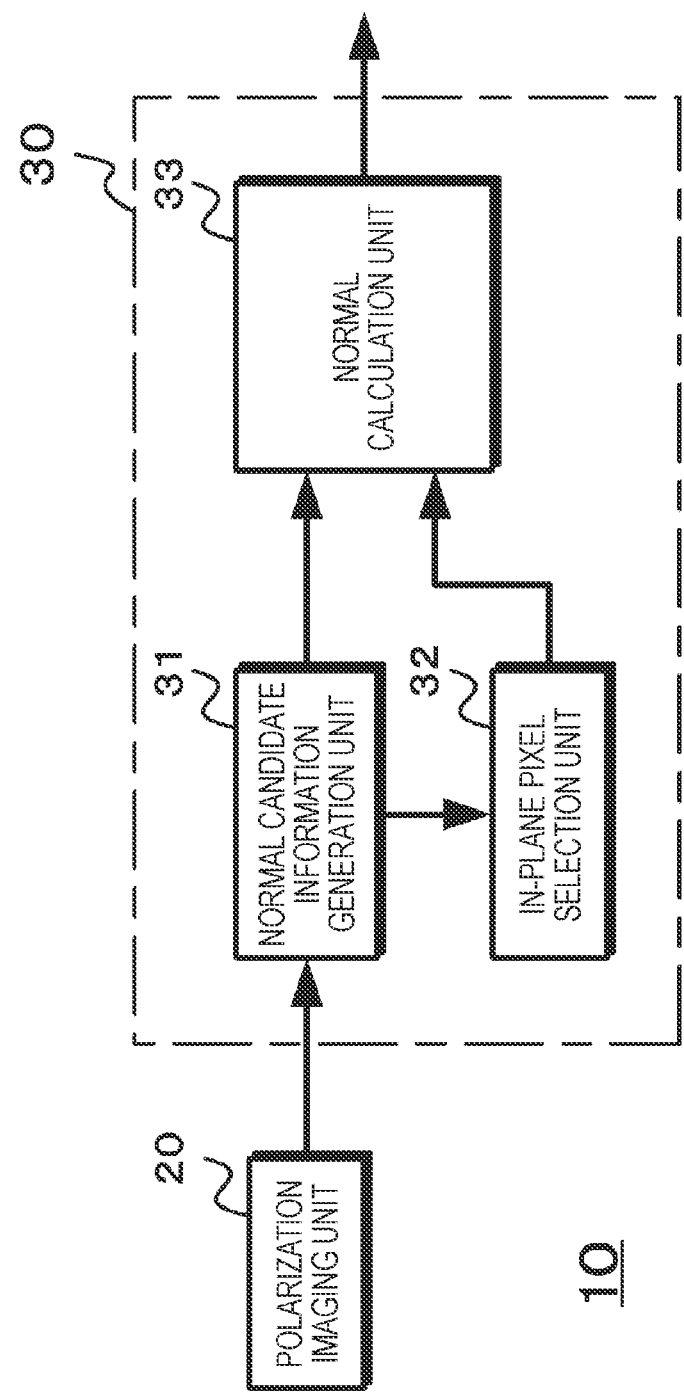

2017/0103280 A1* 4/2017 Kusumi .................... G06T 7/11
2018/0308217 A1 10/2018 Kurita et al.
2020/0195862 A1* 6/2020 Briggs ................... H04N 23/80

FOREIGN PATENT DOCUMENTS

| CN | 108353153 A | 7/2018 | |
|---|---|---|---|
| EP | 3376759 A1 | 9/2018 | |
| JP | 01-106188 A | 4/1989 | |
| JP | 2001-145125 A | 5/2001 | |
| JP | 2017032409 A * | 2/2017 | |
| JP | 2017-072499 A | 4/2017 | |
| WO | 2009/147814 A1 | 12/2009 | |
| WO | WO-2010073547 A1 * | 7/2010 | ........... G06T 7/0065 |
| WO | 2016/088483 A1 | 6/2016 | |
| WO | 2017/081925 A1 | 5/2017 | |
| WO | 2018/061508 A1 | 4/2018 | |

OTHER PUBLICATIONS

Atkinson et al. ("Recovery of surface orientation from diffuse polarization," IEEE Transactions on Image Processing ( vol. 15, Issue: 6, Jun. 2006)) (Year: 2006).*
International Search Report and Written Opinion of PCT Application No. PCT/JP2019/005777, dated Mar. 19, 2019, 08 pages of ISRWO.

* cited by examiner

INFORMATION PROCESSING APPARATUS AND METHOD FOR PROCESSING INFORMATION

CROSS REFERENCE TO RELATED APPLICATIONS

This application is a U.S. National Phase of International Patent Application No. PCT/JP2019/005777 filed on Feb. 18, 2019, which claims priority benefit of Japanese Patent Application No. JP 2018-099440 filed in the Japan Patent Office on May 24, 2018. Each of the above-referenced applications is hereby incorporated herein by reference in its entirety.

TECHNICAL FIELD

The present technology relates to an information processing apparatus, a method for processing information, and a program, and makes it possible to easily calculate a normal in which indeterminacy is cleared on the basis of polarization information.

BACKGROUND ART

Conventionally, there has been proposed a technique of removing indeterminacy of a normal that is to be a problem in the case of estimating the normal of an object surface using polarization information. For example, in Patent Document 1, a normal map calculated by a polarization characteristic acquisition unit and an aligned depth map are integrated to remove indeterminacy. Furthermore, in Patent Document 2, luminance information obtained for each of a plurality of captured images captured in such a manner that light sources for illuminating an object are differently arranged and a plurality of candidate normals calculated using three or more polarization images having polarization states different from each other are used to determine normal information of the object on the basis of the luminance information. Moreover, in Patent Document 3, a normal direction vector of an object is estimated on the basis of a plurality of polarization images having different positions of a point of sight.

CITATION LIST

Patent Document

Patent Document 1: International Publication No. 2016/088483
Patent Document 2: Japanese Patent Application Laid-Open No. 2017-072499
Patent Document 3: International Publication No. 2009/147814

SUMMARY OF THE INVENTION

Problems to be Solved by the Invention

Meanwhile, according to the methods of Patent Document 1 and Patent Document 3, the positions of the point of sight are made to coincide with each other, and thus indeterminacy may not be cleared in a case where information regarding a desired position obtained from one point of sight cannot be obtained from another point of sight due to occlusion or the like. Furthermore, in the case of obtaining luminance information for each of a plurality of captured images as in Patent Document 2, if an imaging device is provided in a mobile object, for example, the position and size of the object in the plurality of polarization images change, whereby the normal of the object may not be calculated.

In view of the above, it is an object of the present technology to provide an information processing apparatus, a method for processing information, and a program capable of easily calculating a normal in which indeterminacy is cleared on the basis of polarization information.

Solutions to Problems

A first aspect of the present technology is directed to:
an information processing apparatus including:
a normal candidate information generation unit that generates normal candidate information for each pixel on the basis of a polarization image in a plurality of polarization directions;
an in-plane pixel selection unit that selects a plurality of pixels indicating a plane to be observed in the polarization image; and
a normal calculation unit that calculates a normal of the plane to be observed on the basis of the normal candidate information of the pixels selected by the in-plane pixel selection unit.

According to the present technology, the normal candidate information generation unit generates normal candidate information for each pixel on the basis of a polarization image in a plurality of polarization directions, and for example, a zenith angle, or an azimuth angle, or a zenith angle and an azimuth angle are generated as the normal candidate information. Furthermore, the in-plane pixel selection unit selects, for example, three or more pixels indicating the plane to be observed in the polarization image. The normal calculation unit calculates the normal of the plane to be observed on the basis of the normal candidate information of the pixels selected by the in-plane pixel selection unit. In a case where the normal candidate information indicates a zenith angle, the normal calculation unit calculates the normal of the plane to be observed on the basis of a line-of-sight axis indicating a light beam direction from the plane to be observed corresponding to the pixel selected by the in-plane pixel selection unit toward a polarization imaging unit that has obtained the polarization image and the zenith angle of the pixel selected by the in-plane pixel selection unit. Furthermore, in a case where the normal candidate information indicates an azimuth angle, the normal calculation unit calculates the normal of the plane to be observed using a phase plane whose plane direction is the azimuth angle of the pixel selected by the in-plane pixel selection unit. For example, the normal calculation unit calculates an intersection line of the phase planes between the pixels selected by the in-plane pixel selection unit, and calculates the normal of the plane to be observed on the basis of the calculated intersection line. Furthermore, the normal calculation unit may calculate the intersection line of the phase planes of all the pixels selected by the in-plane pixel selection unit, and may use the calculated intersection line as the normal of the plane to be observed. In a case where the normal candidate information indicates a zenith angle and an azimuth angle, the normal calculation unit calculates the normal of the plane to be observed using the candidate normal indicated by the zenith angle and the azimuth angle corresponding to the pixel selected by the in-plane pixel selection unit. For example, the normal calculation unit calculates an angular difference of the candidate normals between the pixels selected by the in-plane pixel selection unit, and calculate the normal of the plane to be observed on the basis of the calculated angular difference. Furthermore, the normal calculation unit may set a candidate normal that is similar among all the pixels selected by the in-plane pixel selection unit as the normal of the plane to be observed.

The in-plane pixel selection unit calculates an angular difference between line-of-sight axes of a first line-of-sight axis indicating a light beam direction from the plane to be observed corresponding to a normal calculation target pixel toward a polarization imaging unit that has obtained the polarization image and a second line-of-sight axis indicating a light beam direction from the plane to be observed corresponding to a neighboring pixel toward the polarization imaging unit that has obtained the polarization image, calculates an angular difference between candidate normals of a candidate normal based on a polarization characteristic of the normal calculation target pixel calculated from the polarization image in a plurality of polarization directions and a candidate normal based on a polarization characteristic of the neighboring pixel, and selects the neighboring pixel as a pixel indicating the plane to be observed on the basis of the angular difference between the line-of-sight axes and the angular difference between the candidate normals. Furthermore, in a case where the angular difference between the line-of-sight axes is larger than a threshold value set using the angular difference between the candidate normals, the in-plane pixel selection unit may select the neighboring pixel as the pixel indicating the plane to be observed. Furthermore, a polarization imaging unit that obtains a polarization image in a plurality of polarization directions indicating the plane to be observed may be further provided.

A second aspect of the present technology is directed to:
a method for processing information including:
generating, using a normal candidate information generation unit, normal candidate information for each pixel on the basis of a polarization image in a plurality of polarization directions;
selecting, using an in-plane pixel selection unit, a plurality of pixels indicating a plane to be observed in the polarization image; and
calculating, using a normal calculation unit, a normal of the plane to be observed on the basis of the normal candidate information of the pixels selected by the in-plane pixel selection unit.

A third aspect of the present technology is directed to:
a program that causes a computer to calculate a normal of a plane to be observed, the program causing the computer to perform:
a procedure of generating normal candidate information for each pixel on the basis of a polarization image in a plurality of polarization directions indicating the plane to be observed;
a procedure of selecting a plurality of pixels indicating the plane to be observed in the polarization image; and
a procedure of calculating the normal of the plane to be observed on the basis of the normal candidate information of the selected plurality of pixels.

Note that the program according to the present technology is, for example, a program that can be provided in a computer readable format by, to a general-purpose computer capable of executing various program codes, a storage medium such as an optical disk, a magnetic disk, and a semiconductor memory, for example, or a communication medium such as a network. By providing such a program in the computer readable format, processing according to the program is implemented on the computer.

EFFECTS OF THE INVENTION

According to the present technology, normal candidate information is generated for each pixel on the basis of a polarization image in a plurality of polarization directions, and a normal of a plane to be observed is calculated on the basis of the normal candidate information of a plurality of pixels indicating the plane to be observed in the polarization image. Therefore, it becomes possible to easily calculate the normal in which indeterminacy is cleared. Note that the effects described herein are merely examples and are not limited, and there may be additional effects.

Figure 2:
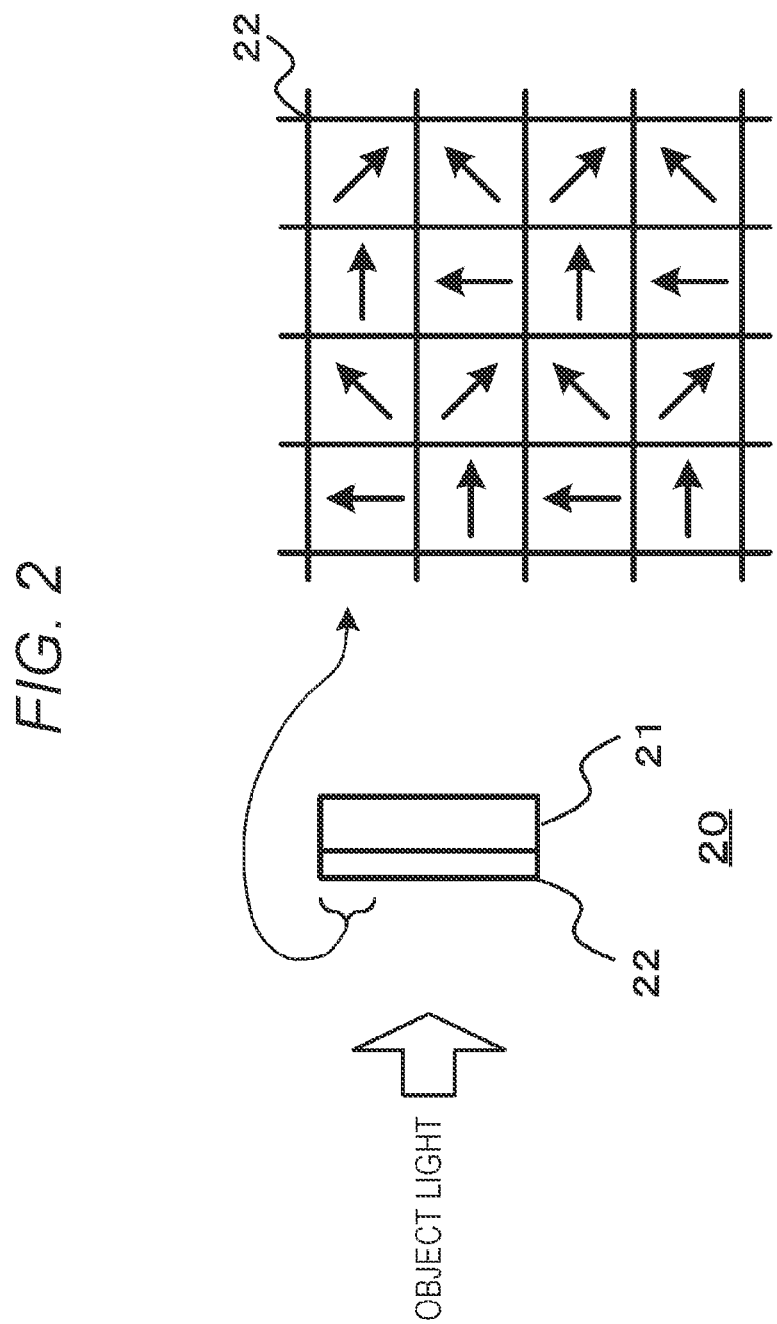
Figure 3:
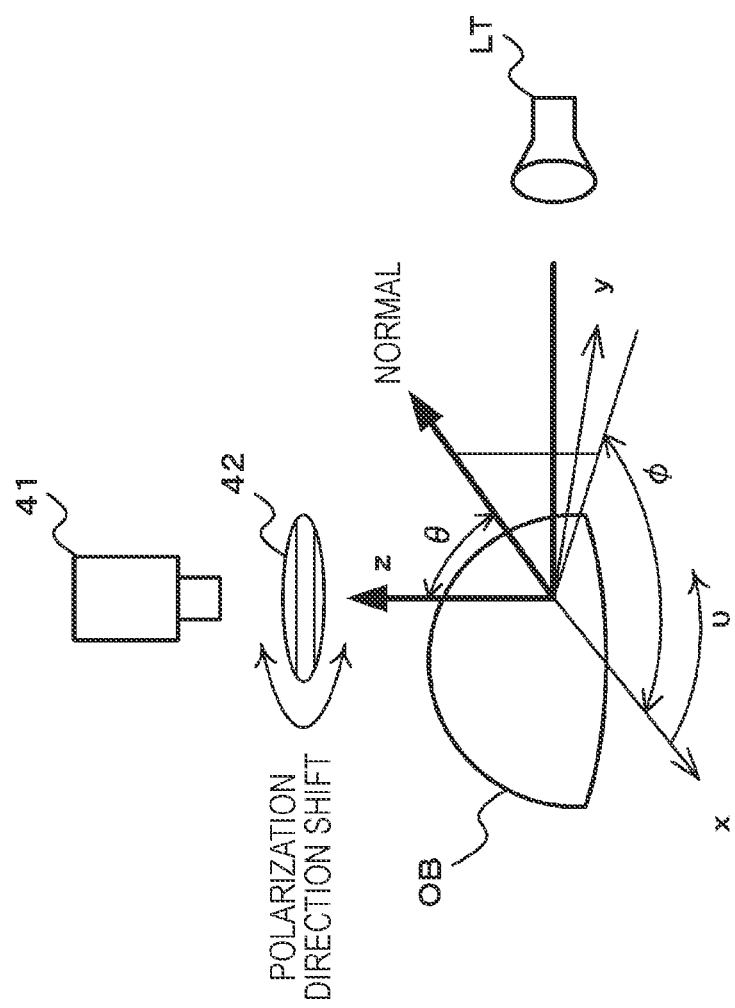
Figure 4:
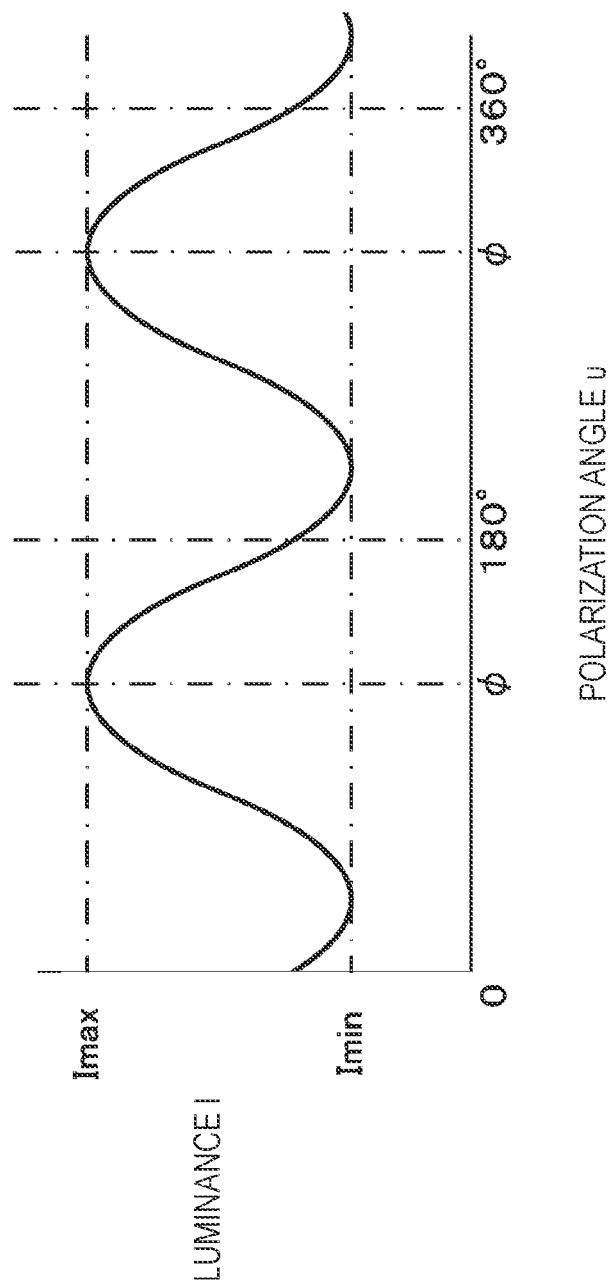
Figure 5:
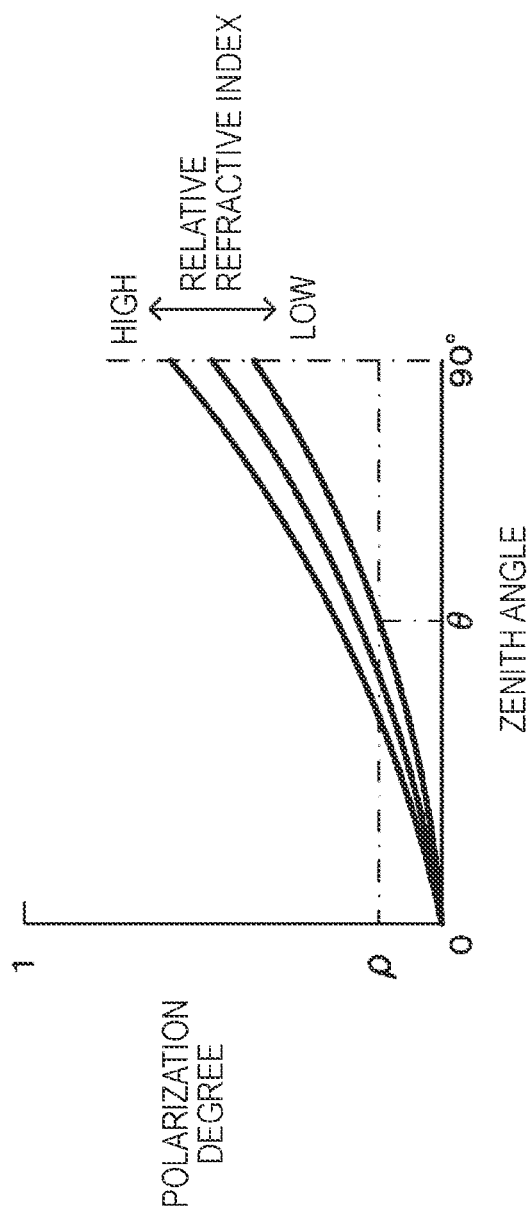
Figure 6:
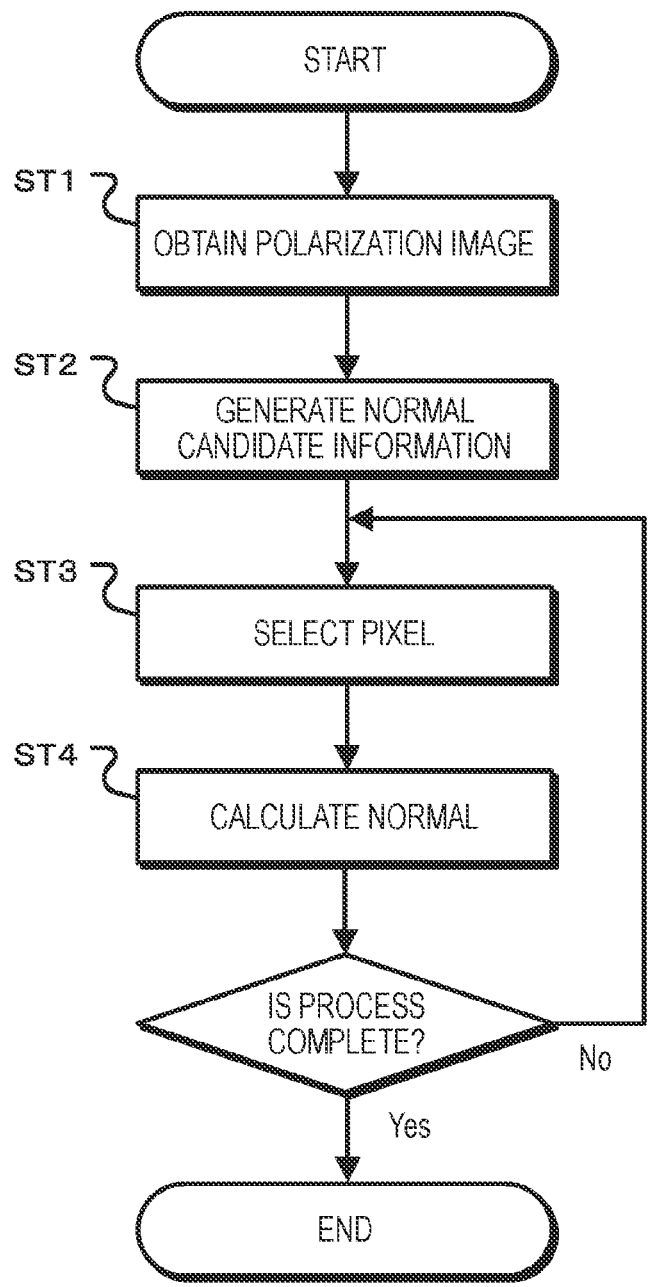
Figure 7:
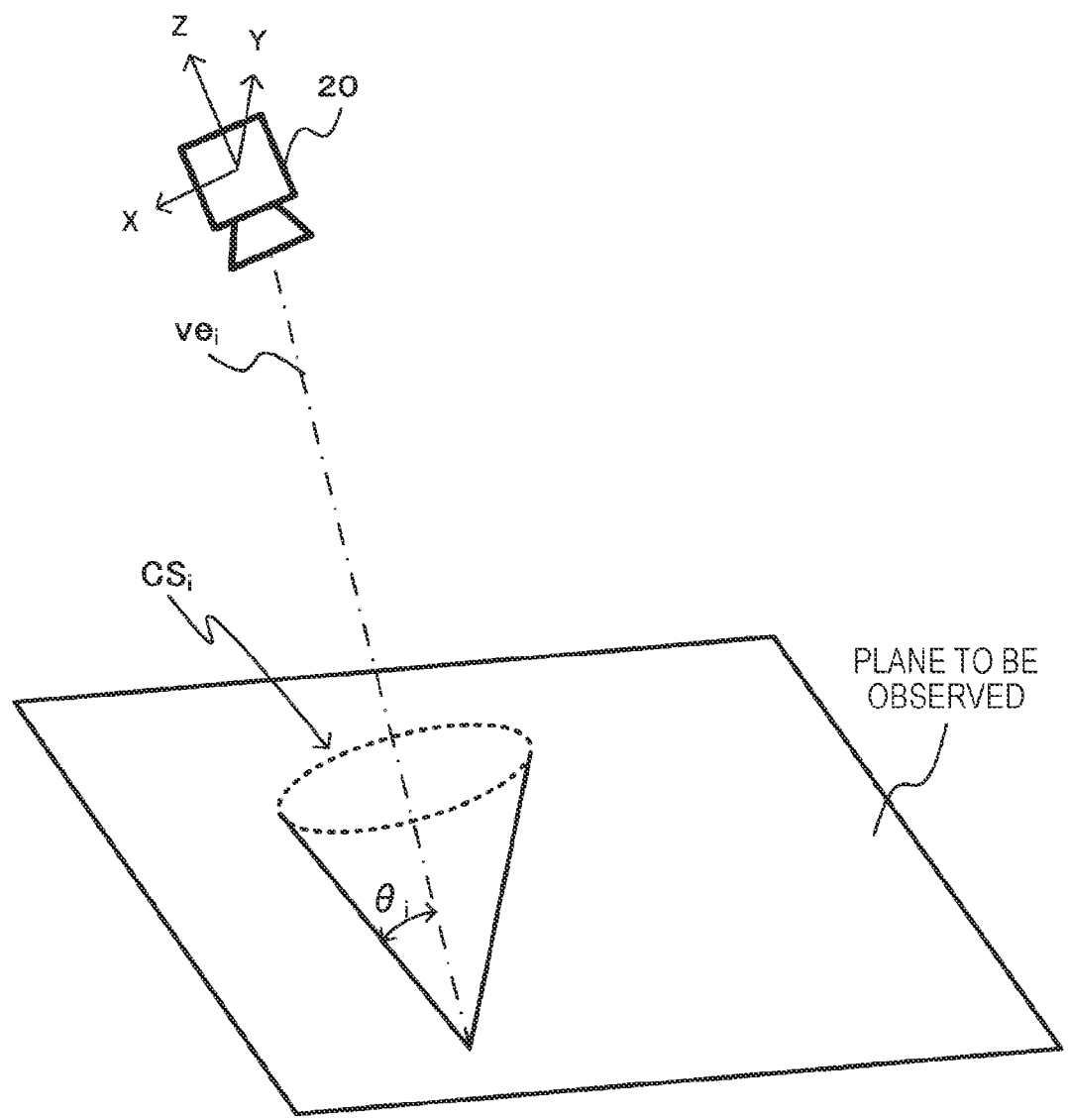
Figure 8B:
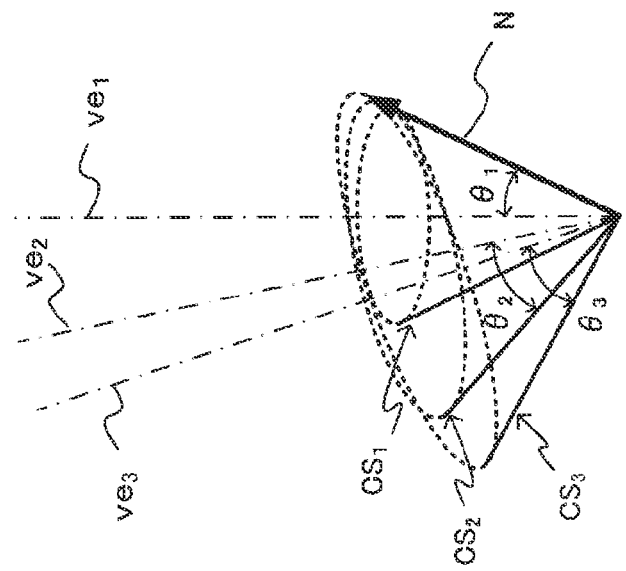
Figure 8A:
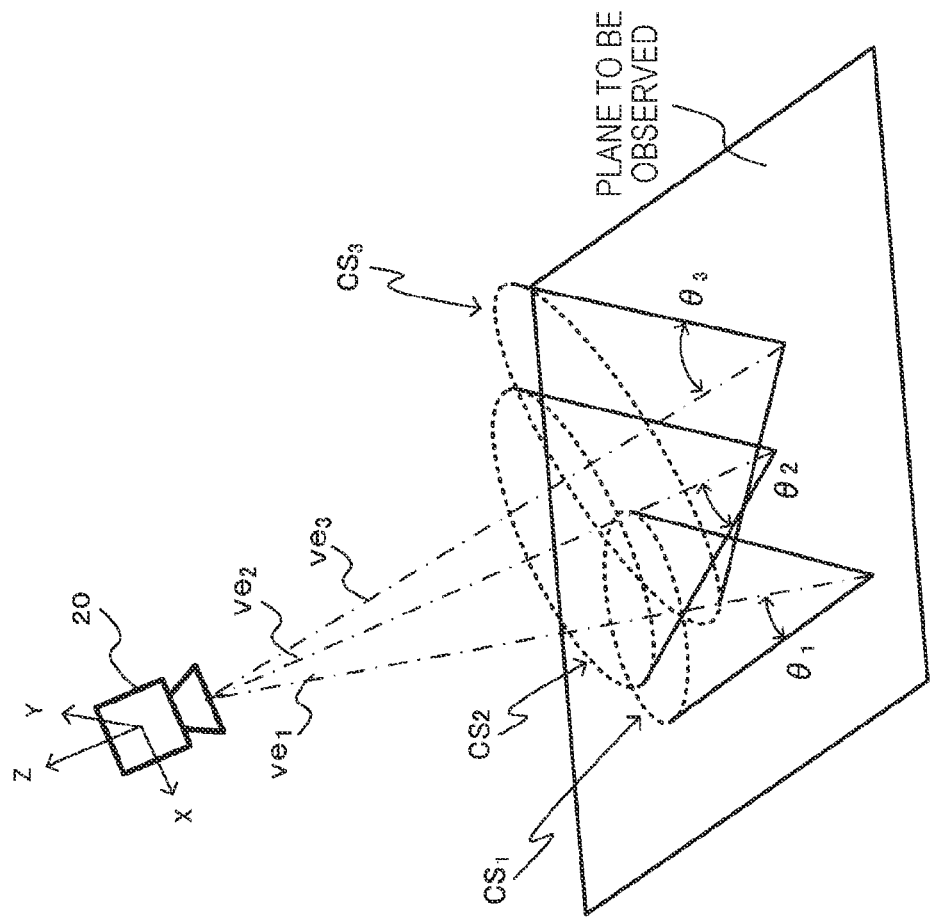
Figure 9B:
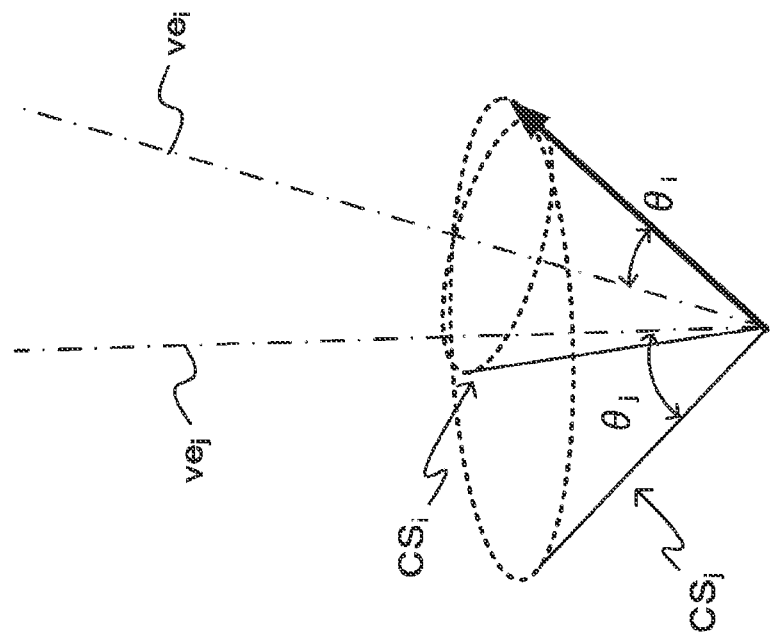
Figure 9A:
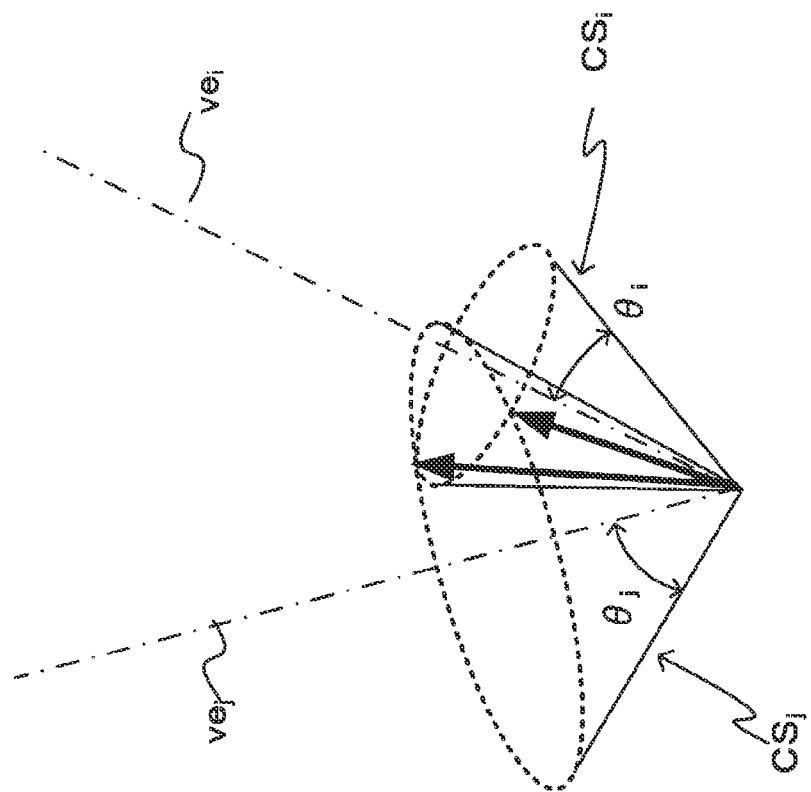
Figure 10:
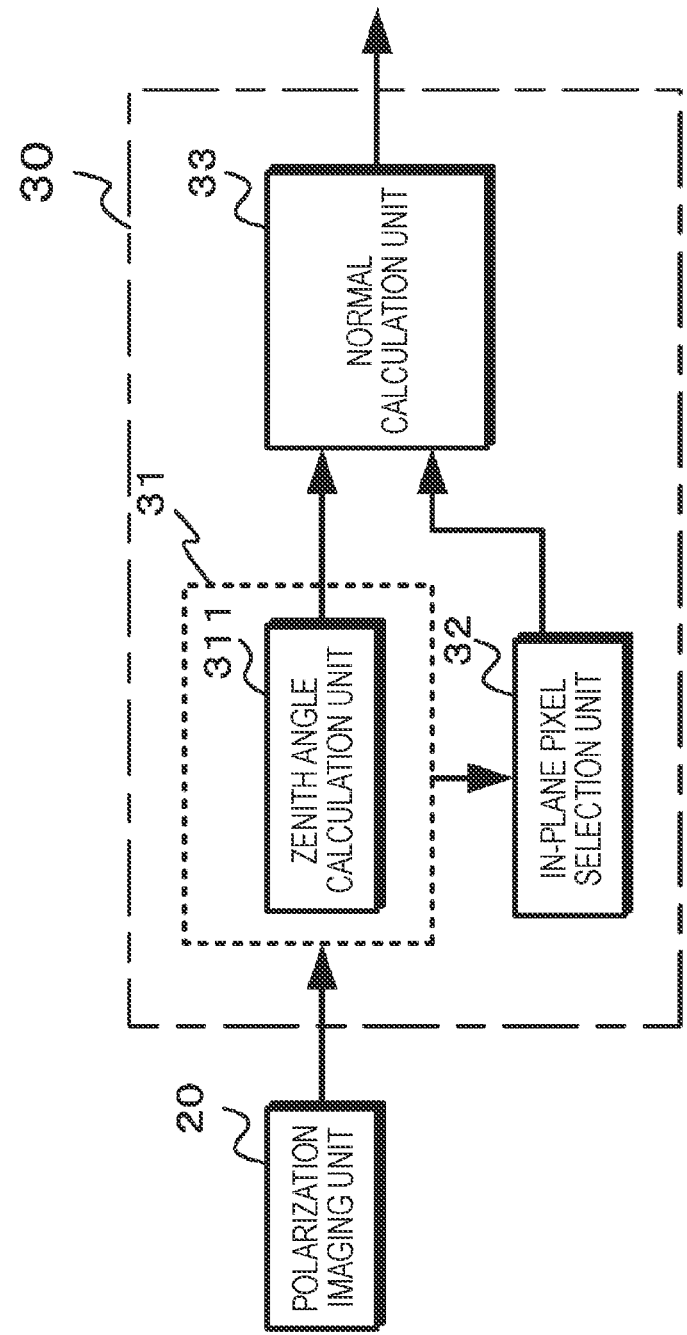
Figure 11:
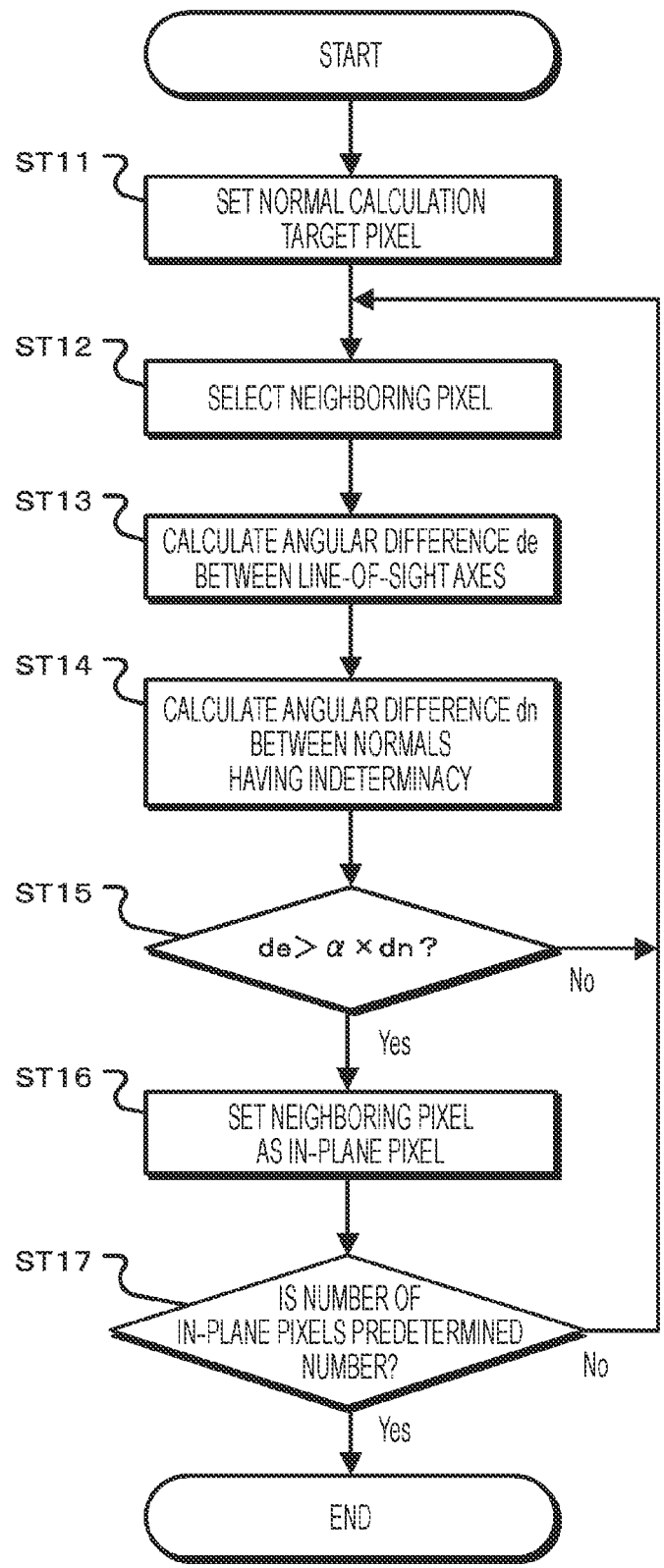
Figure 12:
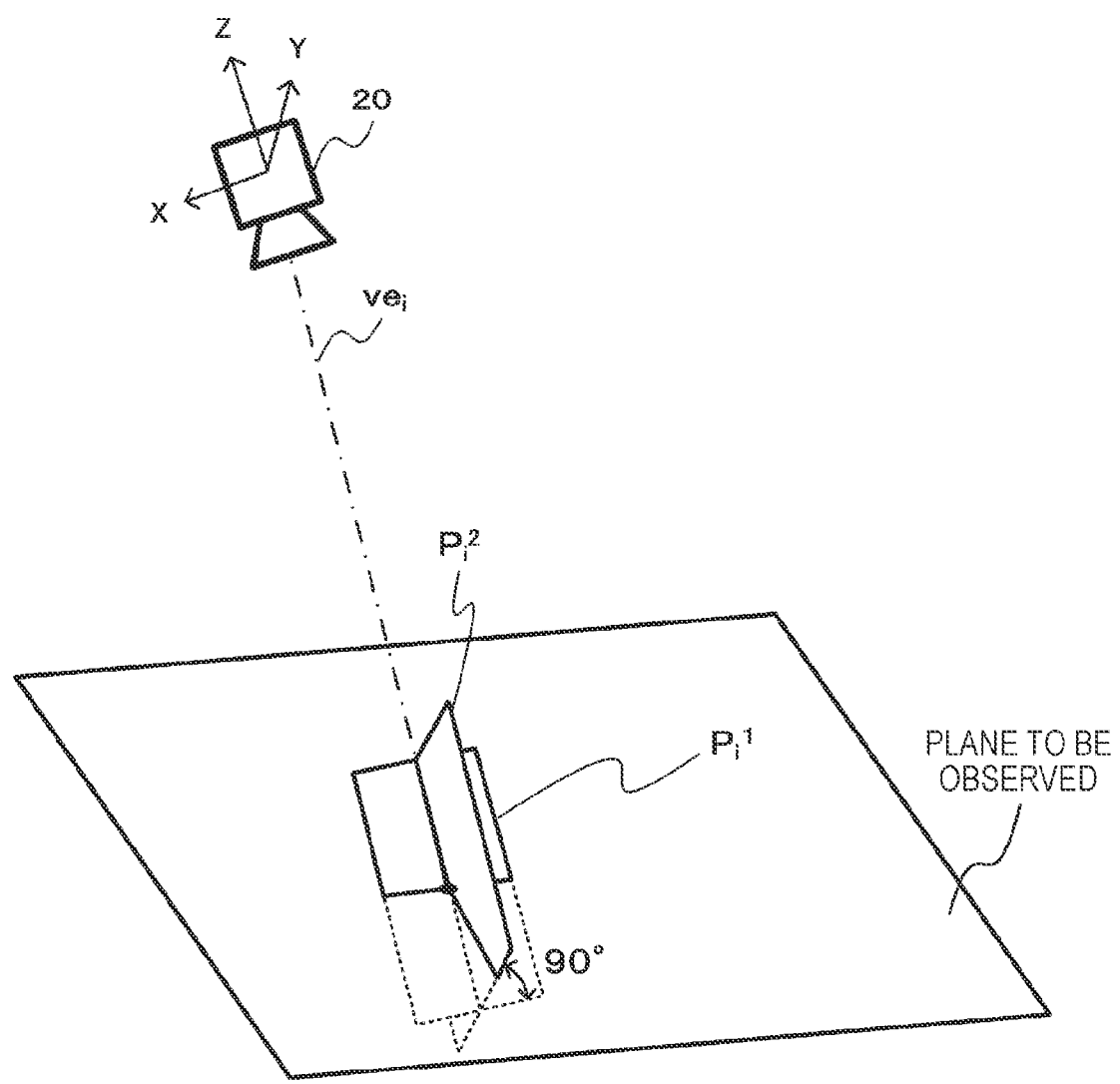
Figure 13:
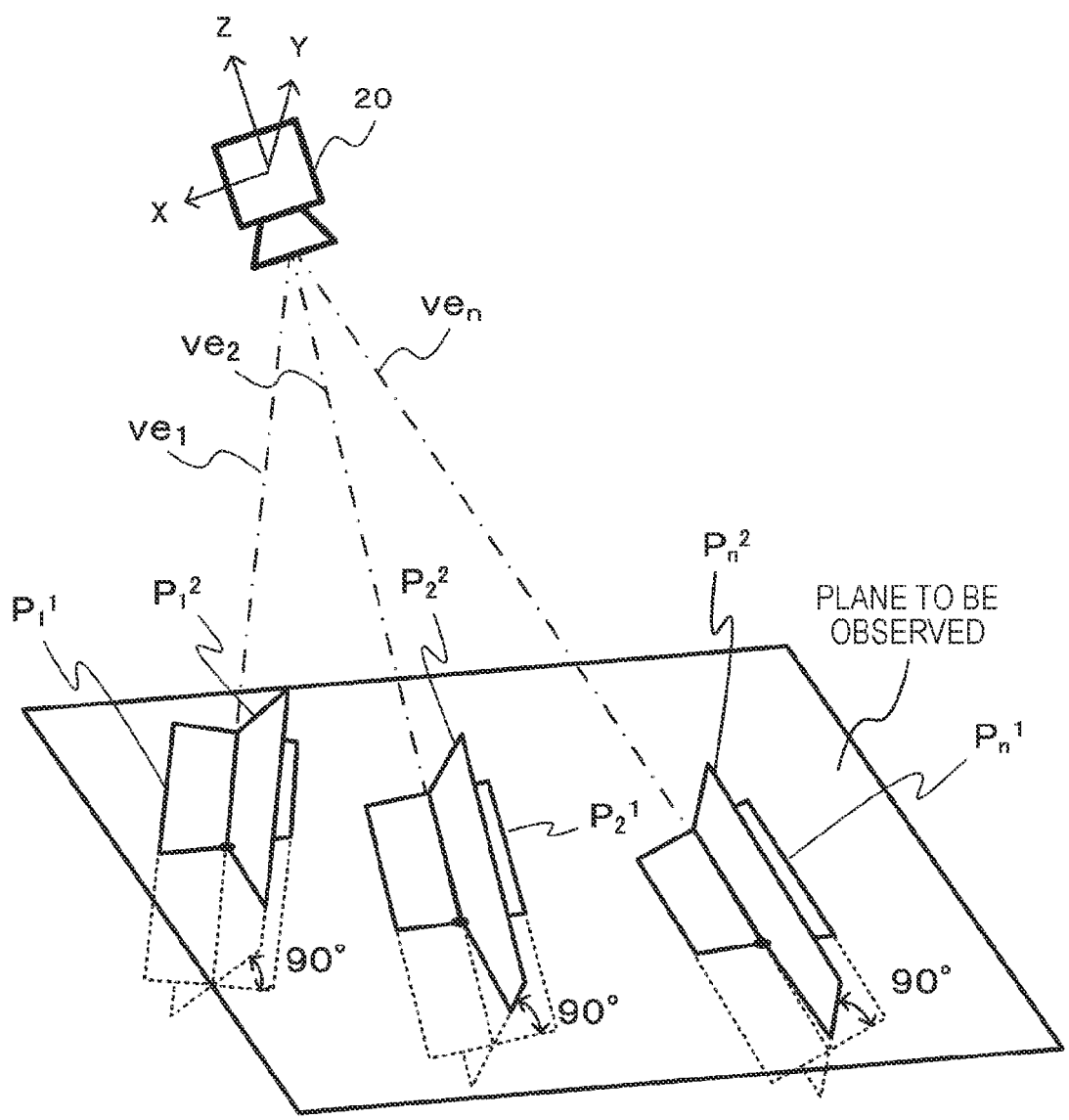
Figure 14A:
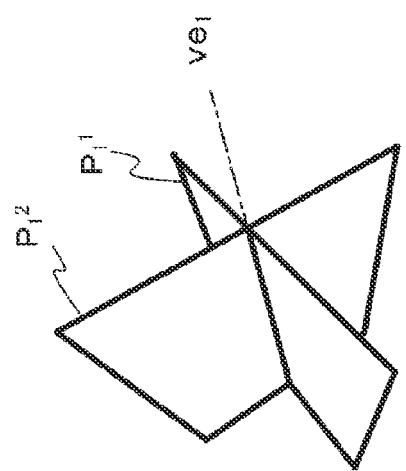
Figure 14B:
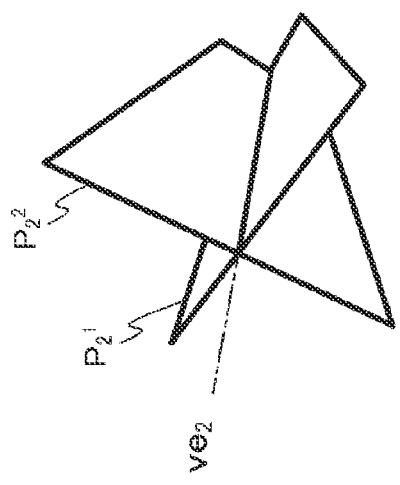
Figure 14C:
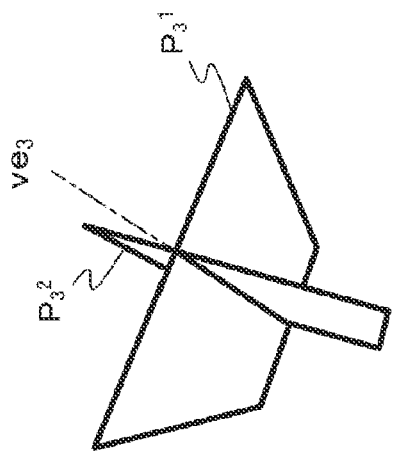
Figure 15:
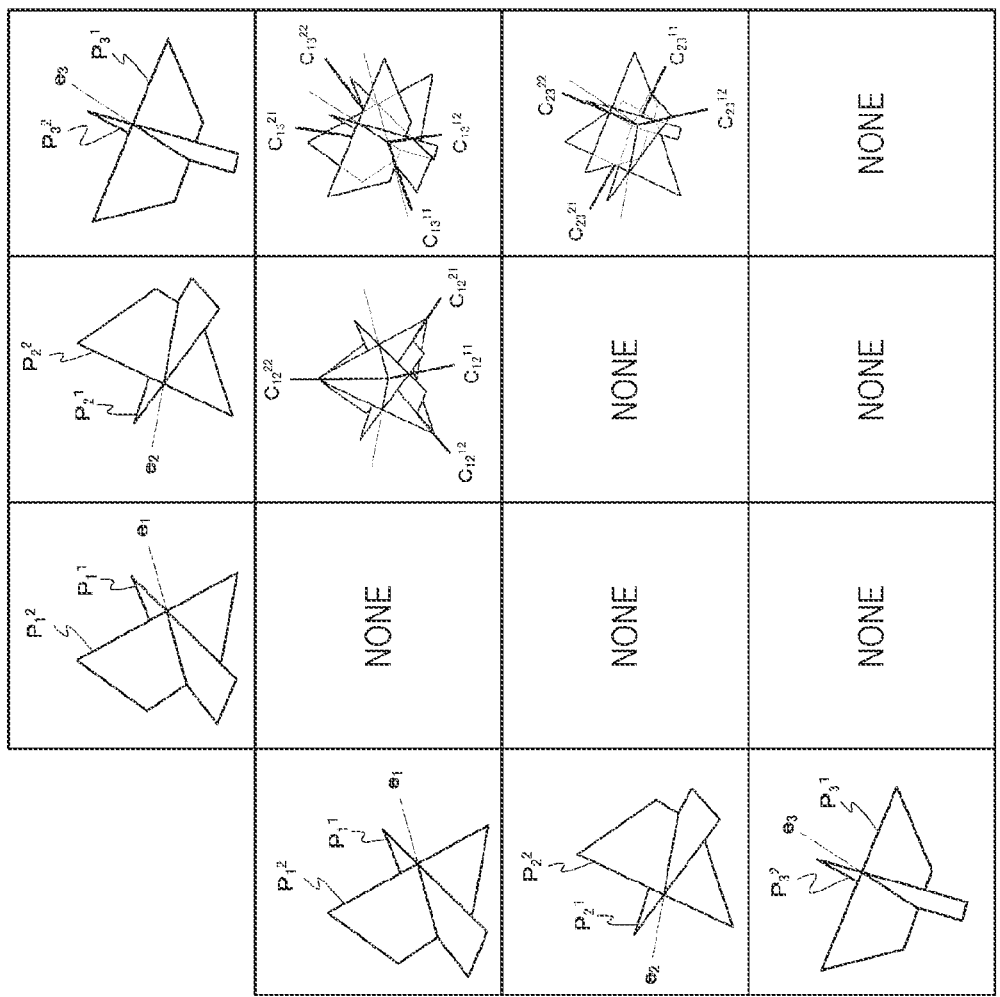
Figure 16B:
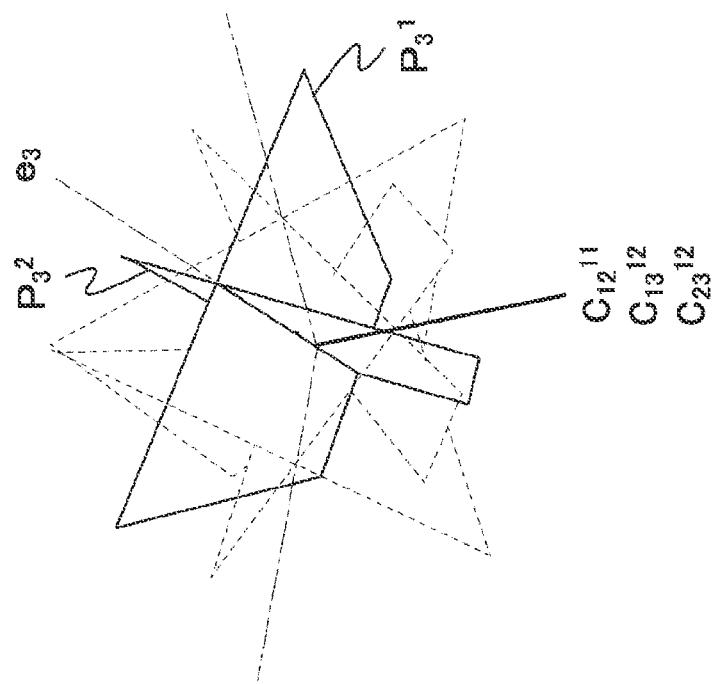
Figure 16A:
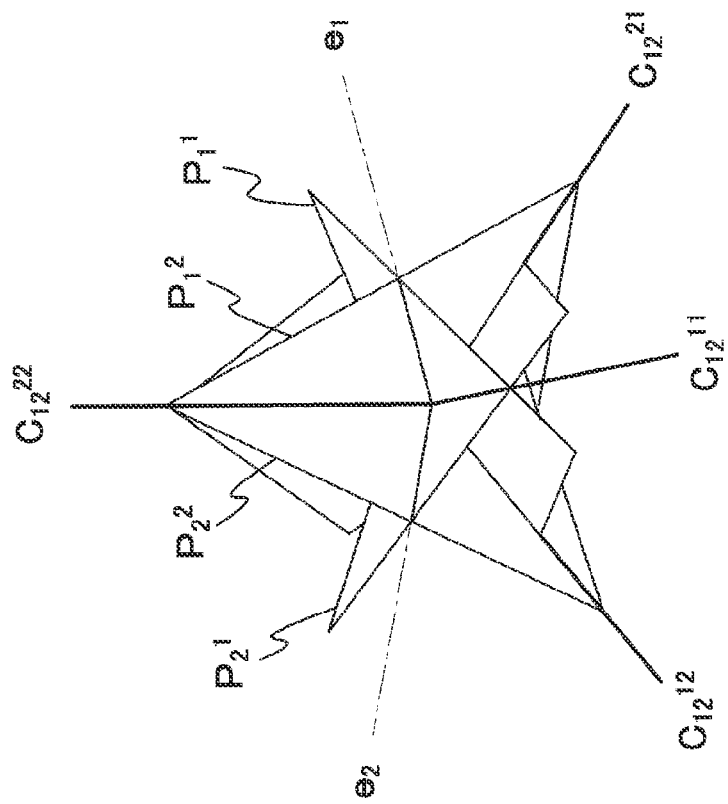
Figure 17:
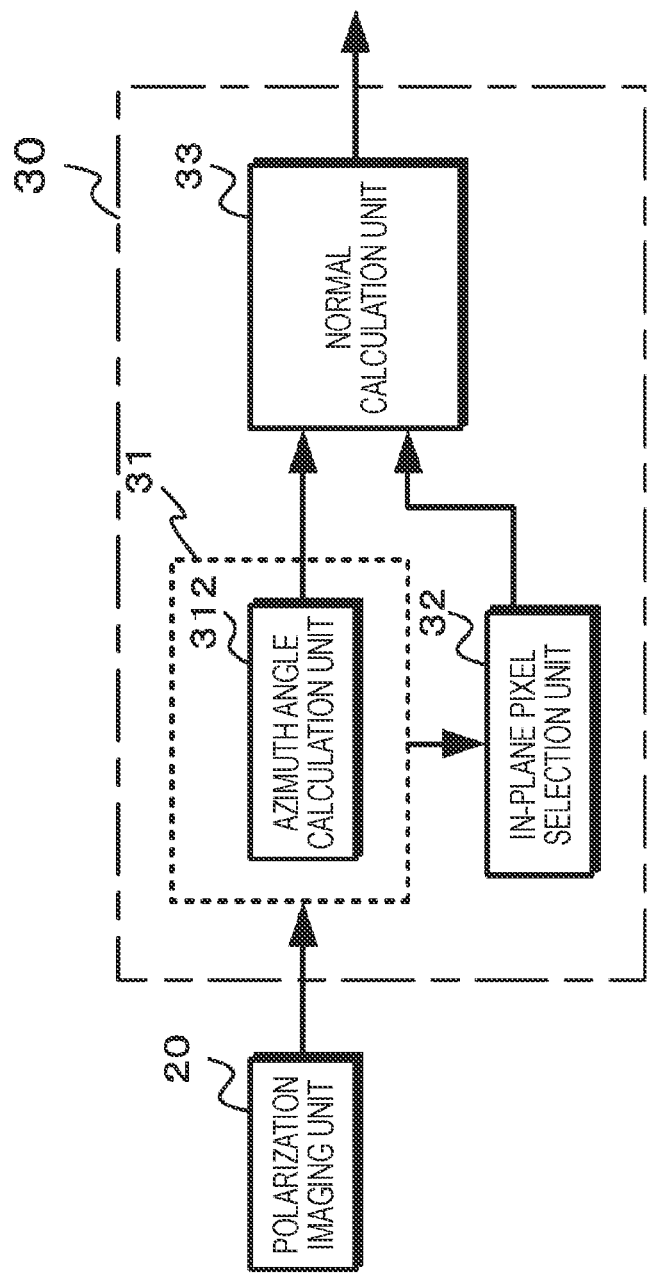
Figure 18:
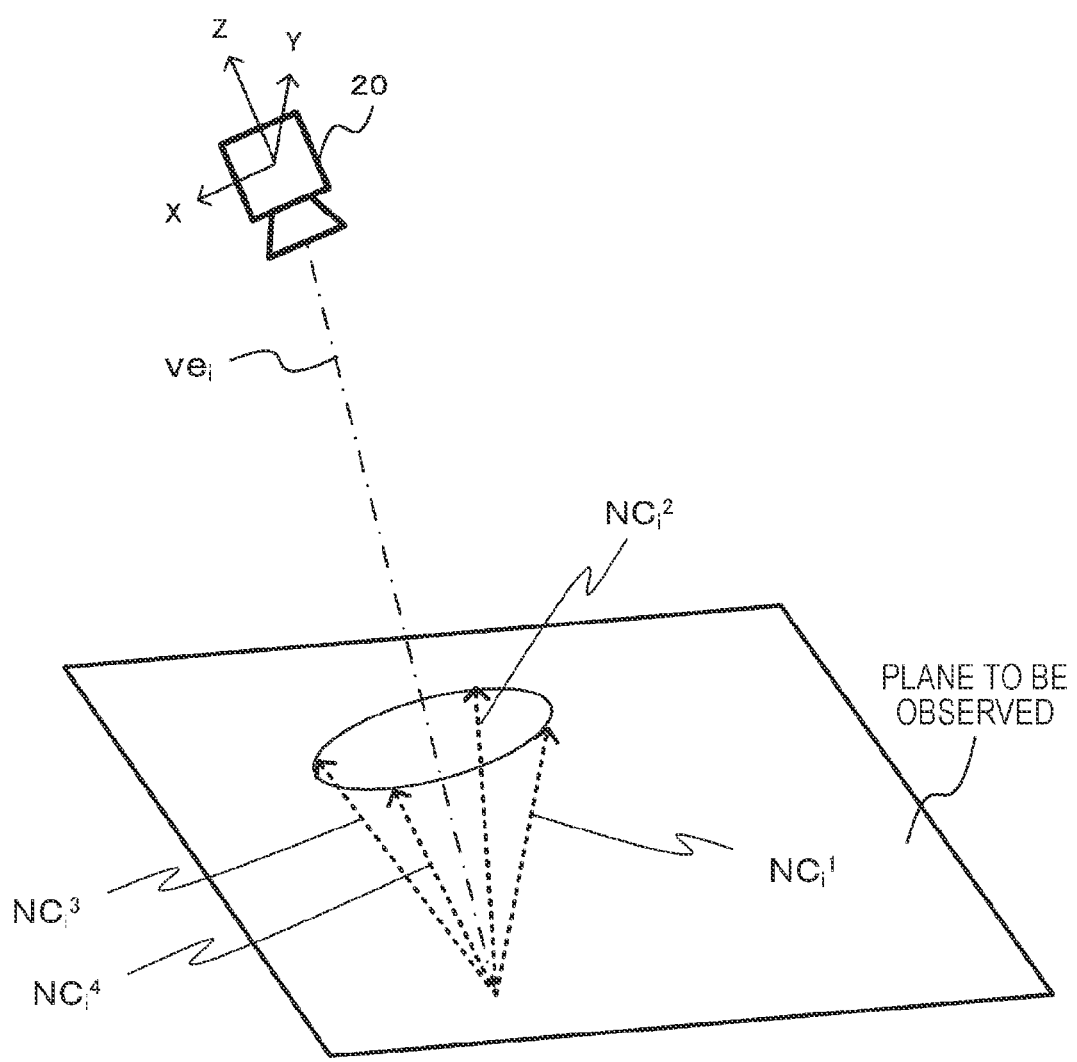
Figure 19B:
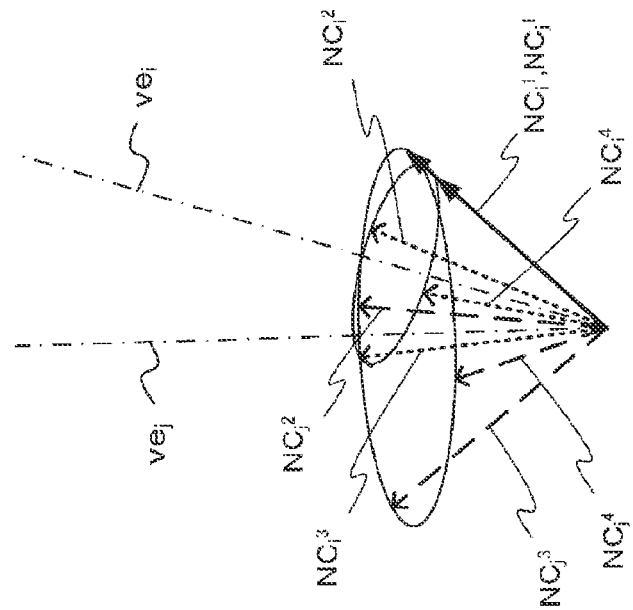
Figure 19A:
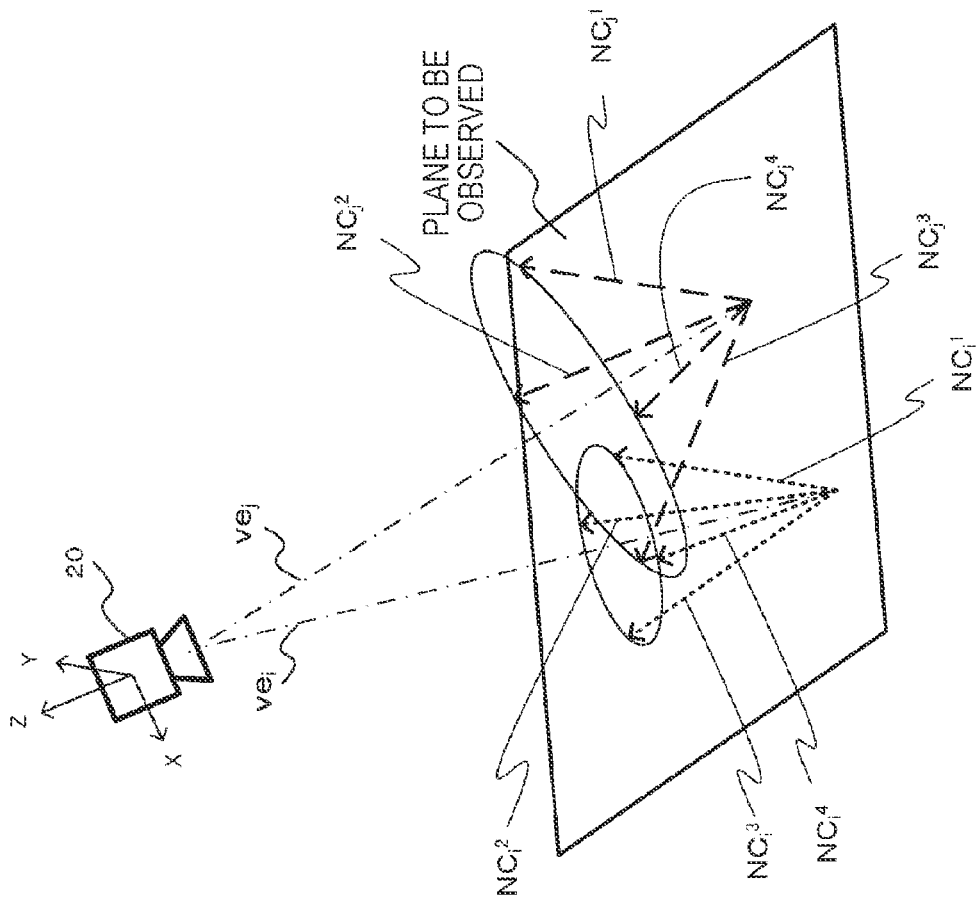
Figure 20:
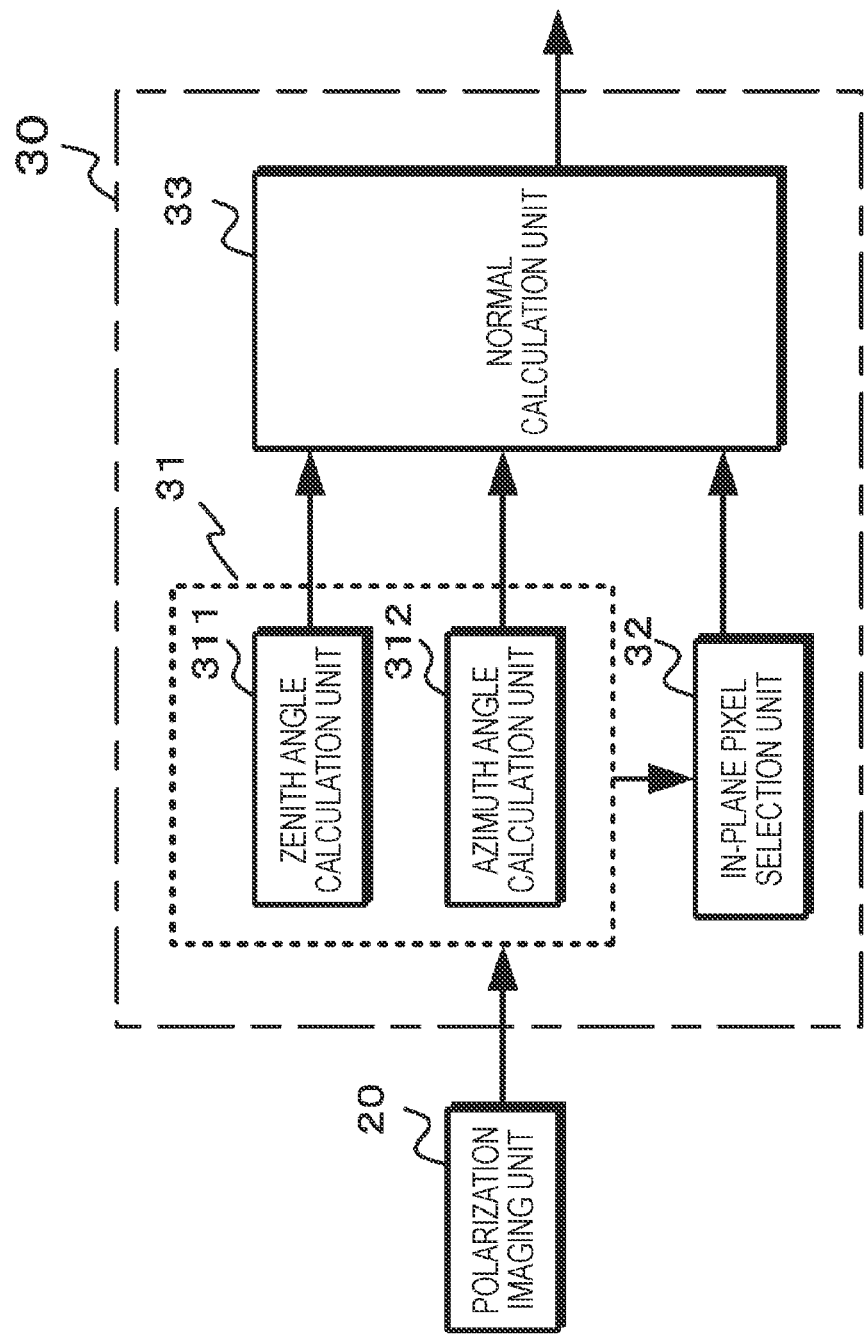

FIG. 1 is a diagram illustrating a system configuration.
FIG. 2 is a diagram exemplifying a configuration of a polarization imaging unit.
FIG. 3 is a diagram for explaining a relationship between a polarization image and a plane to be observed.
FIG. 4 is a graph exemplifying a relationship between luminance and a polarization angle.
FIG. 5 is a graph illustrating a relationship between a polarization degree and a zenith angle.
FIG. 6 is a flowchart illustrating operation of an information processor.
FIG. 7 is a diagram for explaining a principle of a first embodiment.
FIGS. 8A and 8B are diagrams illustrating a case of using zenith angles on three different line-of-sight axes.
FIGS. 9A and 9B are diagrams illustrating a case of two different line-of-sight axes.
FIG. 10 is a diagram exemplifying a configuration of the first embodiment.
FIG. 11 is a flowchart exemplifying operation of a pixel selection process.
FIG. 12 is a diagram for explaining a principle of a second embodiment.
FIG. 13 is a diagram exemplifying a case where a line-of-sight axis is increased by one.
FIGS. 14A, 14B, and 14C are diagrams exemplifying a phase plane for each line-of-sight axis.
FIG. 15 is a diagram illustrating an intersection line for each combination of line-of-sight axes.
FIGS. 16A and 16B are diagrams exemplifying a case of using azimuth angles on three different line-of-sight axes.
FIG. 17 is a diagram exemplifying a configuration of the second embodiment.
FIG. 18 is a diagram for explaining a principle of a third embodiment.
FIGS. 19A and 19B are diagrams exemplifying a case of using two line-of-sight axes.
FIG. 20 is a diagram exemplifying a configuration of the third embodiment.

MODE FOR CARRYING OUT THE INVENTION

Hereinafter, modes for implementing the present technology will be described. Note that descriptions will be given in the following order.
1. System Configuration and Operation
2. First Embodiment
3. Second Embodiment
4. Third Embodiment
5. Other Embodiments
6. Applications 1. System Configuration and Operation FIG. 1 illustrates a configuration of a system using an information processing apparatus according to the present technology. An information processing system 10 includes a polarization imaging unit 20 and an information processor 30.

The polarization imaging unit 20 includes, for example, a polarization imager, and obtains a polarization image in at least three different polarization directions (non-polarization may be included in the polarization direction) to output it to the information processor 30. FIG. 2 exemplifies a configuration of the polarization imaging unit. The polarization imaging unit 20 has, for example, a configuration in which a polarization filter 22 having a pixel configuration of a plurality of polarization directions is disposed on a light incident surface of an image sensor 21. By performing imaging using the polarization imaging unit 20 having such a configuration, a polarization image having polarization components in a plurality of directions can be obtained. Note that FIG. 2 exemplifies a case where the polarization filter 22 by which each pixel becomes any of four different polarization directions (arrows indicate the polarization directions) is disposed on the front surface of the image sensor 21. The polarization imaging unit 20 outputs the obtained polarization image to the information processor 30. Furthermore, the polarization imaging unit 20 may include a color mosaic filter or the like on the light incident surface of the image sensor 21 so that a polarization image for each color component can be obtained. Furthermore, the polarization image obtained by the polarization imaging unit 20 may be supplied to the information processor 30 via a recording medium or the like, thereby performing off-line processing.

The information processor 30 calculates a normal of the plane to be observed included in the polarization image on the basis of the polarization image obtained by the polarization imaging unit 20. The information processor 30 includes a normal candidate information generation unit 31, an in-plane pixel selection unit 32, and a normal calculation unit 33.

Here, a relationship between the polarization image and the plane to be observed will be described. As illustrated in FIG. 3, for example, an object OB is illuminated using a light source LT, and an imaging unit 41 images the object OB via a polarizing plate 42. In this case, in the captured image, the luminance of the object OB changes according to the polarization direction of the polarizing plate 42. Note that the highest luminance is referred to as Imax and the lowest luminance is referred to as Imin. Furthermore, with an x-axis and a y-axis in two-dimensional coordinates being set on the plane of the polarizing plate 42, a polarization direction of the polarizing plate 42 is referred to as a polarization angle $\upsilon$ that is an angle in the y-axis direction with respect to the x-axis. The polarization direction of the polarizing plate 42 has a cycle of 180 degrees, and it returns to the original polarization state when it rotates by 180 degrees. Furthermore, the polarization angle $\upsilon$ at the time when the maximum luminance Imax is observed is referred to as an azimuth angle $\varphi$. With such a definition, if the polarization direction of the polarizing plate 42 is changed, the luminance I to be observed can be expressed by a polarization model formula of the formula (1). Note that FIG. 4 exemplifies a relationship between the luminance and the polarization angle.

[Numeral 1]

$$I = \frac{I_{max} + I_{min}}{2} + \frac{I_{max} - I_{min}}{2} \cos 2(\upsilon - \phi) \quad (1)$$

In the formula (1), the polarization angle $\upsilon$ is apparent at the time of generating the polarization image, and the maximum luminance Imax, the minimum luminance Imin, and the azimuth angle $\varphi$ are variables.

Furthermore, when the polarization direction of the polarizing plate 42 is changed and the minimum luminance Imin and the maximum luminance Imax are obtained, a polarization degree $\rho$ can be calculated on the basis of the formula (2). As expressed in the formula (2), the polarization degree $\rho$ can be calculated using a relative refractive index $n_r$ of the object OB and a zenith angle $\theta$ that is an angle from a z-axis to a normal. Note that the z-axis in this case is a line-of-sight axis indicating a light beam direction from an observation target point of the object OB toward the imaging unit 41.

[Numeral 2]

$$\rho = \frac{I_{max} - I_{min}}{I_{max} + I_{min}} = \frac{(n_r - 1/n_r)\sin^2\theta}{2 + 2n_r^2 - (n_r + 1/n_r)^2 \sin^2\theta + 4\cos\theta\sqrt{n_r^2 - \sin^2\theta}} \quad (2)$$

The relationship between the polarization degree and the zenith angle has, for example, the characteristic illustrated in FIG. 5, and the characteristic can be used to calculate the zenith angle $\theta$ on the basis of the polarization degree $\rho$. Note that the characteristic illustrated in FIG. 5 is dependent on the relative refractive index $n_r$, as apparent from the formula (2), and the polarization degree increases as the relative refractive index $n_r$ increases.

The polarization model formula expressed by the formula (1) has periodicity of 180°, and the azimuth angle is known to cause a phase difference of 90° between a part where specular reflection is dominant and a part where diffuse reflection is dominant. Therefore, an azimuth angle $\varphi^1$ that is the polarization angle $\upsilon$ at which the maximum luminance Imax is observed, an azimuth angle $\varphi^2$ (=$\varphi^1$+90°), an azimuth angle $\varphi^3$ (=$\varphi^1$+180°), and an azimuth angle $\varphi^4$ (=$\varphi^1$+270°) are candidates for the azimuth angle indicating the correct normal, and the azimuth angles $\varphi^1$ to $\varphi^4$ will also be referred to as candidate azimuth angles in the following descriptions.

The normal candidate information generation unit 31 generates normal candidate information for each pixel on the basis of the polarization image in a plurality of polarization directions. The normal candidate information is information related to a normal having indeterminacy with respect to the plane to be observed. The normal candidate information generation unit 31 may use, for example, the zenith angle $\theta$ as the normal candidate information, or may use the candidate azimuth angles $\varphi^1$, $\varphi^2$, $\varphi^3$, and $\varphi^4$ as the normal candidate information. Moreover, the normal candidate information generation unit 31 may use the zenith angle $\theta$ and the candidate azimuth angles $\varphi^1$, $\varphi^2$, $\varphi^3$, and $\varphi^4$ as the normal candidate information. Note that, in the polarization imaging unit 20 illustrated in FIG. 2, luminance in four polarization directions can be obtained with a pixel block of 2×2 pixels, whereby processing may be carried out with the pixel block of 2×2 pixels serving as one pixel of a polarization image. Furthermore, interpolation processing or the like may be performed using luminance values of pixels in the same polarization direction to carry out the processing in such a manner that each pixel indicates luminance values in four polarization directions.

The in-plane pixel selection unit 32 selects a plurality of pixels indicating the plane to be observed in the polarization image. The in-plane pixel selection unit 32 selects a plurality of pixels indicating the plane to be observed as in-plane pixels. Note that details of the in-plane pixel selection unit 32 will be described later.

The normal calculation unit 33 calculates the normal of the plane to be observed on the basis of the normal candidate information of the plurality of in-plane pixels selected by the in-plane pixel selection unit 32.

FIG. 6 is a flowchart illustrating operation of the information processor. In step ST1, the information processor obtains a polarization image. The information processor 30 obtains the polarization image with three or more polarization directions obtained by the polarization imaging unit 20, and proceeds to step ST2.

In step ST2, the information processor generates normal candidate information. The information processor 30 generates, on the basis of the polarization image obtained in step ST1, the normal candidate information for each pixel, which is, for example, information indicating the zenith angle or the azimuth angle or the zenith angle and the azimuth angle of the normal having indeterminacy, and proceeds to step ST3.

In step ST3, the information processor performs pixel selection processing. The information processor 30 performs the pixel selection processing, selects a plurality of pixels indicating the plane to be observed as in-plane pixels, and proceeds to step ST4.

In step ST4, the information processor calculates a normal. The information processor 30 calculates the normal of the plane to be observed using the normal candidate information of the plurality of in-plane pixels selected in step ST3 indicating the plane to be observed, and proceeds to step ST5.

In step ST5, the information processor determines whether the process is complete. In a case where there is a plane to be observed for which a normal has not been calculated, the information processor 30 returns to step ST3 and selects in-plane pixels indicating a new plane to be observed. Furthermore, in a case where normals have been calculated for all desired planes to be observed, the process is complete.

2. First Embodiment

Next, a first embodiment of the information processor 30 will be described. In the first embodiment, a case where a zenith angle is used as normal candidate information will be described.

FIG. 7 is a diagram for explaining a principle of the first embodiment. In the first embodiment, a normal of a plane to be observed is calculated on the basis of a line-of-sight axis and a zenith angle of each pixel of a plurality of pixels indicating the plane to be observed. Note that an x-axis, a y-axis, and a z-axis represent a camera coordinate system, the x-axis is the horizontal direction of a polarization imaging unit 20, for example, the y-axis is the perpendicular direction of the polarization imaging unit 20, for example, the z-axis is the optical axis direction of the polarization imaging unit 20, and the two-dimensional plane indicated by the x-axis and the y-axis corresponds to the plane of the polarizing plate 42 in FIG. 2 described above. Furthermore, with regard to the line-of-sight axis in the embodiments of the present technology, the light beam direction from the plane to be observed corresponding to the pixels selected by the in-plane pixel selection unit 32 toward the polarization imaging unit 20 that has obtained the polarization image is referred to as a line-of-sight axis.

Here, a normalized vector $E_i$ indicating a line-of-sight axis $ve_i$ with respect to a pixel i of the polarization imaging unit 20 is assumed to be $(e_i^x, e_i^y, e_i^z)$ T. Furthermore, a zenith angle $\theta_i$ is to be the angular difference between the line-of-sight axis and the normal. That is, the correct normal is located on the surface of a conical surface $CS_i$ having the line-of-sight axis as a rotation axis and the angle with the line-of-sight axis being "$\theta_i$".

A relationship between the normalized vector $E_i$, a normal N at the pixel i, and the zenith angle $\theta_i$ is expressed by the formula (3). The formula (3) corresponds to the formula (4), whereby the formula (5) with the normal N being $(n_x, n_y, n_z)^T$ is established.

[Numeral 3]

$$\arccos(N \cdot E_i) = \theta_i \quad (3)$$

$$N \cdot E_i = \cos \theta_i \quad (4)$$

$$e_i^x n_x + e_i^y n_y + e_i^z n_z = \cos \theta_i \quad (5)$$

Therefore, the normal N can be calculated from the equation (5) for each line-of-sight axis using the zenith angles on three or more different line-of-sight axes. FIGS. 8A and 8B illustrate a case of using zenith angles on three different line-of-sight axes. As illustrated in FIG. 8A, the information processor 30 can calculate, using zenith angles θ1, θ2, . . . and θn on different line-of-sight axes ve1, ve2, . . . and yen, the normal N=(nx, ny, nz)T from the formula (6) indicating the relationship between the normalized vector E1 (=(e1x, e1y, e1z)T), the normal N, and the zenith angle θ1, the formula (7) indicating the relationship between the normalized vector E2 (=(e2x, e2y, e2z)T), the normal N, and the zenith angle θ2, . . . , and the formula (8) indicating the relationship between the normalized vector En (=(enx, eny, enz)T), the normal N, and the zenith angle θn. Note that the formulae (6) to (8) can be expressed as the formula (9). Furthermore, "B" in the formula (9) is a matrix expressed by the formula (10), and "E" is a matrix expressed by the formula (11).

[Numeral 4]

$$\begin{cases} e_1^x n_x + e_1^y n_y + e_1^z n_z = \cos\theta_1 & (6) \\ e_2^x n_x + e_2^y n_y + e_2^z n_z = \cos\theta_2 & (7) \\ \quad \vdots \\ e_n^x n_x + e_n^y n_y + e_n^z n_z = \cos\theta_n & (8) \end{cases}$$

$$E \cdot N = B \quad (9)$$

$$B = (\cos\theta_1, \cos\theta_2, \ldots, \cos\theta_n)^T \quad (10)$$

$$E = \begin{bmatrix} e_1^x & e_1^y & e_1^z \\ e_2^x & e_2^y & e_2^z \\ \vdots & \ddots & \vdots \\ e_n^x & e_n^y & e_n^z \end{bmatrix} \quad (11)$$

As described above, in a case where there are three different line-of-sight axes, the normal N of the plane to be observed that is the tangent line of a conical surface CS1, a conical surface CS2, and a conical surface CS3 illustrated in FIG. 8B can be calculated on the basis of the formula (12). Furthermore, in a case where there are more than three different line-of-sight axes, the normal N of the plane to be observed can be calculated on the basis of the formula (13). Note that FIGS. 9A and 9B illustrate a case where there are two different line-of-sight axes, and as illustrated in FIG. 9A, even in a case where there is a plurality of intersection lines (lines indicated by arrows) between the conical surfaces of the two line-of-sight axes, the normal can be calculated as described above by increasing the line-of-sight axis. Furthermore, as illustrated in FIG. 9B, in a case where the conical surfaces of the two line-of-sight axes are in contact, the tangent line may be the normal of the plane to be observed.

[Numeral 5]

$$N = E^{-1} \cdot B \quad (12)$$

$$N = (E^T E)^{-1} E^T \cdot B \quad (13)$$

FIG. 10 exemplifies a configuration of the first embodiment. The information processor 30 outputs, to the normal calculation unit 33, the zenith angle calculated by a zenith angle calculation unit 311 provided in the normal candidate information generation unit 31 as normal candidate information.

The zenith angle calculation unit 311 calculates the zenith angle θ for each pixel on the basis of the polarization image obtained by the polarization imaging unit 20. The zenith angle calculation unit 311 calculates the polarization degree ρ from the minimum luminance Imin and the maximum luminance Imax as described above, and calculates the zenith angle θ for each pixel on the basis of the polarization degree ρ. The zenith angle calculation unit 311 outputs the zenith angle θ calculated for each pixel to the normal calculation unit 33.

The in-plane pixel selection unit 32 selects a plurality of pixels indicating the plane to be observed. For example, the in-plane pixel selection unit 32 selects, as neighboring pixels j, pixels located in the periphery of the normal calculation target pixels indicating the plane to be observed. Moreover, the in-plane pixel selection unit 32 calculates, on the basis of the formula (14), an angular difference de between the normalized vector $E_i$ indicating the line-of-sight axis $ve_i$ of a normal calculation target pixel i and a normalized vector $E_j$ indicating a line-of-sight axis $ve_j$ of the neighboring pixel j. Furthermore, the in-plane pixel selection unit 32 calculates, on the basis of the formula (15), an angular difference dn between a normal $N_i$ having indeterminacy with respect to the normal calculation target pixel i and a normal $N_j$ having indeterminacy with respect to the neighboring pixel j. Note that the normal having indeterminacy is a normal indicated by the zenith angle θ and the candidate azimuth angles $\varphi^1$ to $\varphi^4$, and the angular difference dn is the minimum angular difference in combinations of the normals having indeterminacy.

[Numeral 6]

$$de = \arccos\left(\frac{E_i \cdot E_j}{|E_i||E_j|}\right) \quad (14)$$

$$dn = \arccos\left(\frac{N_i \cdot N_j}{|N_i||N_j|}\right) \quad (15)$$

Moreover, the in-plane pixel selection unit 32 compares the angular difference using the angular difference de and the angular difference dn, and in a case where "de>α×dn", the neighboring pixels j are set as in-plane pixels for calculating a normal. Note that the coefficient α is a control parameter for controlling the angular difference comparison, and as the coefficient α increases, the neighboring pixels to be set as the in-plane pixels become pixels with smaller angular difference dn. The in-plane pixel selection unit 32 selects three or more in-plane pixels from pixels within a predetermined range with respect to the normal calculation target pixel, and outputs, to the normal calculation unit 33, in-plane pixel information (e.g., index information or pixel position of the selected pixel, etc.) that enables the selected pixels to be discriminated. Note that the in-plane pixels also include the normal calculation target pixels.

The normal calculation unit 33 calculates a normal of the plane to be observed on the basis of the zenith angle and the line-of-sight axis of the pixel selected by the in-plane pixel selection unit 32. Specifically, the normal calculation unit 33 performs calculation of the formula (12) or (13) using the zenith angle θ and the normalized vector E of the line-of-sight axis of the in-plane pixel indicated by the in-plane pixel information supplied from the in-plane pixel selection unit 32, thereby calculating a normal of the plane to be observed.

Furthermore, in the case of the first embodiment, information indicating the zenith angle is generated as the normal candidate information in the processing of step ST2 in the flowchart illustrated in FIG. 6. Furthermore, in the processing of step ST4, calculation of the formula (12) or (13) is performed using the zenith angle θ and the normalized vector E of the line-of-sight axis of the in-plane pixel, thereby calculating the normal of the plane to be observed.

FIG. 11 is a flowchart exemplifying operation of the pixel selection processing performed in step ST3 of the flowchart illustrated in FIG. 6.

In step ST11, the information processor sets a normal calculation target pixel. The in-plane pixel selection unit 32 of the information processor 30 sets a pixel at a desired position in the polarization image as a normal calculation target pixel, and proceeds to step ST12. Note that a plane including the normal calculation target pixel is to be the plane to be observed.

In step ST12, the information processor selects a neighboring image. The in-plane pixel selection unit 32 of the information processor 30 selects a pixel located around the normal calculation target pixel set in step ST11 as a neighboring pixel, and proceeds to step ST13.

In step ST13, the information processor calculates the angular difference de between the line-of-sight axes. The in-plane pixel selection unit 32 of the information processor 30 calculates the angular difference de between the line-of-sight axis of the normal calculation target pixel and the line-of-sight axis of the neighboring pixel, and proceeds to step ST14.

In step ST14, the information processor calculates the angular difference dn between the normals having indeterminacy. The in-plane pixel selection unit 32 of the information processor 30 calculates the angular difference dn between the indeterminate normal of the normal calculation target pixel and the indeterminate normal of the neighboring pixel, and proceeds to step ST15.

In step ST15, the information processor determines whether the angular difference satisfies a predetermined condition (e.g., de>α×dn). In a case where the angular difference does not satisfy the predetermined condition described above, the in-plane pixel selection unit 32 of the information processor 30 returns to step ST12 and selects a new neighboring pixel. Furthermore, in a case where the predetermined condition is satisfied, the in-plane pixel selection unit 32 proceeds to step ST16.

In step ST16, the information processor sets the neighboring image as an in-plane pixel. The in-plane pixel selection unit 32 of the information processor 30 sets the neighboring pixel whose angular difference satisfies the predetermined condition as an in-plane pixel, and proceeds to step ST17.

In step ST17, the information processor determines whether the number of in-plane pixels reaches a predetermined number. In a case where the number of pixels of the in-plane pixels in which the normal calculation target pixel is included in the in-plane pixels has not reached a predetermined number (e.g., three), the in-plane pixel selection unit 32 of the information processor 30 returns to step ST12 and selects a new neighboring pixel. Furthermore, in a case where the number of pixels of the in-plane pixels has reached the predetermined number, selection of in-plane pixels ends.

As described above, according to the first embodiment, it becomes possible to easily calculate a normal in which indeterminacy is cleared using a zenith angle for each of a plurality of line-of-sight axes. In other words, it becomes possible to correctly calculate the normal of the plane to be observed. Furthermore, the normal of the plane to be observed can be correctly calculated on the basis of the polarization image obtained by one-time imaging, whereby the normal of the plane to be observed can be calculated even in a case where the polarization imaging unit 20 is provided in a mobile object. Therefore, it is not required to provide a plurality of polarization imaging units.

3. Second Embodiment

Next, a second embodiment of the information processor 30 will be described. In the second embodiment, a case where an azimuth angle is used as normal candidate information will be described.

FIG. 12 is a diagram for explaining a principle of the second embodiment. In the second embodiment, a normal of a plane to be observed is calculated on the basis of a line-of-sight axis and an azimuth angle of each pixel of a plurality of pixels indicating the plane to be observed. Note that an x-axis, a y-axis, and a z-axis represent a camera coordinate system, and for example, the x-axis is the horizontal direction of a polarization imaging unit 20, the y-axis is the perpendicular direction of the polarization imaging unit 20, and the z-axis is the optical axis direction of the polarization imaging unit 20.

Here, a phase plane $P_i^1$ is to correspond to candidate azimuth angles $\varphi_i^1$ and $\varphi_i^3$ ($=\varphi_i^1+180°$), and a phase plane $P_i^2$ is to correspond to candidate azimuth angles $\varphi_i^2$ ($=\varphi_i^1+90°$) and $\varphi_i^4$ ($=\varphi_i^2+180°$). The phase plane indicates a phase plane corresponding to the azimuth angle in a case where diffuse reflection is dominant, and a phase plane corresponding to the azimuth angle in a case where specular reflection is dominant (having 90° phase difference with respect to the azimuth angle in the case where diffuse reflection is dominant). In this case, it may not be determined which of the phase planes $P_i^1$ and $P_i^2$ the correct normal is on. In view of the above, a plurality of line-of-sight axes is used. For example, in a case where the line-of-sight axis is increased by one as illustrated in FIG. 13, phase planes $P_j^1$ and $P_j^2$ exist in addition to the phase planes $P_i^1$ and $P_i^2$. Note that the phase plane $P_j^1$ is a phase plane corresponding to candidate azimuth angles $\varphi_j^1$ and $\varphi_j^3$ ($=\varphi_j^1+180°$) in a pixel j adjacent to a pixel i, and the phase plane $P_j^2$ is a phase plane corresponding to candidate azimuth angles $\varphi_j^2$ ($=\varphi_j^1+90°$) and $\varphi_j^4$ ($=\varphi_j^2+180°$) in the pixel j.

The information processor 30 performs calculation of the formulae (16) to (19), thereby calculating the intersection line between the phase planes. Note that, in the formulae (16) to (19), the symbol with a cross inside a circle indicates that the intersection line of the phase plane is calculated.

[Numeral 7]

$$\begin{cases} c_{ij}^{11} = P_i^1 \otimes P_j^1 & (16) \\ c_{ij}^{12} = P_i^1 \otimes P_j^2 & (17) \\ c_{ij}^{21} = P_i^2 \otimes P_j^1 & (18) \\ c_{ij}^{22} = P_i^2 \otimes P_j^2 & (19) \end{cases}$$

Table 1 exemplifies formulae for calculating intersection lines between a plurality of line-of-sight axes.

TABLE 1

|  | $ve_1$ | $ve_2$ | $ve_3$ | ... | $ve_n$ |
|---|---|---|---|---|---|
| $ve_1$ | NONE | $C_{12}^{11} = P_1^1 \otimes P_2^1$ <br> $C_{12}^{12} = P_1^1 \otimes P_2^2$ <br> $C_{12}^{21} = P_1^2 \otimes P_2^1$ <br> $C_{12}^{22} = P_1^2 \otimes P_2^2$ | $C_{13}^{11} = P_1^1 \otimes P_3^1$ <br> $C_{13}^{12} = P_1^1 \otimes P_3^2$ <br> $C_{13}^{21} = P_1^2 \otimes P_3^1$ <br> $C_{13}^{22} = P_1^2 \otimes P_3^2$ | ... | $C_{1n}^{11} = P_1^1 \otimes P_n^1$ <br> $C_{1n}^{12} = P_1^1 \otimes P_n^2$ <br> $C_{1n}^{21} = P_1^2 \otimes P_n^1$ <br> $C_{1n}^{22} = P_1^2 \otimes P_n^2$ |
| $ve_2$ | NONE | NONE | $C_{23}^{11} = P_2^1 \otimes P_3^1$ <br> $C_{23}^{12} = P_2^1 \otimes P_3^2$ <br> $C_{23}^{21} = P_2^2 \otimes P_3^1$ <br> $C_{23}^{22} = P_2^2 \otimes P_3^2$ | ... | $C_{2n}^{11} = P_2^1 \otimes P_n^1$ <br> $C_{2n}^{12} = P_2^1 \otimes P_n^2$ <br> $C_{2n}^{21} = P_2^2 \otimes P_n^1$ <br> $C_{2n}^{22} = P_2^2 \otimes P_n^2$ |
| $ve_3$ | NONE | NONE | NONE | ... | $C_{3n}^{11} = P_3^1 \otimes P_n^1$ <br> $C_{3n}^{12} = P_3^1 \otimes P_n^2$ <br> $C_{3n}^{21} = P_3^2 \otimes P_n^1$ <br> $C_{3n}^{22} = P_3^2 \otimes P_n^2$ |
| ... | NONE | NONE | NONE | ... | ... |
| $ve_n$ | NONE | NONE | NONE | ... | NONE |

Here, a case of using three line-of-sight axes ve1, ve2, and ve3 will be exemplified. FIGS. 14A, 14B, and 14C exemplify a phase plane for each line-of-sight axis. Phase planes P11 and P12 of the line-of-sight axis ve1 are illustrated in FIG. 14A. Phase planes P21 and P22 of the line-of-sight axis ve2 are illustrated in FIG. 14B. Phase planes P31 and P32 of the line-of-sight axis ve3 are illustrated in FIG. 14C. FIG. 15 illustrates an intersection line for each combination of line-of-sight axes. For example, in a case where the line-of-sight axis ve1 and the line-of-sight axis ve2 are used, the intersection line of the phase planes P11 and P21 is the intersection line C1211, the intersection line of the phase planes P11 and P22 is the intersection line C1212, the intersection line of the phase planes P12 and P21 is the intersection line C1221, and the intersection line of the phase planes P12 and P22 is the intersection line C1222.

The information processor 30 calculates, using phase planes of a plurality of line-of-sight axes, an intersection line of phase planes corresponding to two different line-of-sight axes for each combination of the line-of-sight axes, and sets a concentrated intersection line as a normal of the plane to be observed. The intersection line may be concentrated using a statistical method or a clustering method. For example, the statistical method is used in a case where noise of the azimuth angle is small, and the clustering method is used in a case where noise is large. In the statistical method, for example, a histogram of an intersection line $C_{uv}$ (u and v are indexes assigned to line-of-sight axes, e.g., one to n (the number of line-of-sight axes)) is created, and the direction with the highest frequency is to be the normal direction. Furthermore, in the clustering method, for example, the mean shift is used to set the average direction of clusters where intersections are most concentrated as the normal direction.

Furthermore, the information processor 30 may calculate intersection lines of the phase planes of the line-of-sight axes for all the selected in-plane pixels, and set them as normals of the plane to be observed. FIGS. 16A and 16B exemplify a case where the information processor 30 uses the azimuth angles on three different line-of-sight axes. Note that FIGS. 16A and 16B exemplify a case of calculating the intersection lines of the three line-of-sight axes ve1, ve2, and ve3. In FIG. 16A, in a case where the line-of-sight axis ve1 and the line-of-sight axis ve2 are used, the intersection line of the phase planes P11 and P21 is the intersection line C1211, the intersection line of the phase planes P11 and P22 is the intersection line C1212, the intersection line of the phase planes P12 and P21 is the intersection line C1221, and the intersection line of the phase planes P12 and P22 is the intersection line C1222. A case where the line-of-sight axis ve3 is further used is illustrated in FIG. 16B, and in a case where the line-of-sight axes ve1, ve2, and ve3 are used, the intersection line C1211 of the phase planes P11 and P21, the intersection line C1312 of the phase planes P11 and P32, and the intersection line C2312 of the phase planes P21 and P32 coincide with each other. Therefore, the intersection line C1211 (C1312, C2312) is set as the normal of the plane to be observed.

FIG. 17 exemplifies a configuration of the second embodiment. The information processor 30 outputs, to the normal calculation unit 33, the azimuth angle calculated by an azimuth angle calculation unit 312 provided in the normal candidate information generation unit 31 as normal candidate information.

The azimuth angle calculation unit 312 calculates a candidate azimuth angle φ for each pixel on the basis of the polarization image obtained by the polarization imaging unit 20. The azimuth angle calculation unit 312 sets a polarization angle υ when the maximum luminance Imax is observed as described above as a candidate azimuth angle $\varphi^1$. Furthermore, angles that cause phase differences of 90°, 180°, and 270° with respect to the candidate azimuth angle $\varphi^1$ are set as candidate azimuth angles $\varphi^2$, $\varphi^3$, and $\varphi^4$. The azimuth angle calculation unit 312 outputs the candidate azimuth angles $\varphi^1$, $\varphi^2$, $\varphi^3$, and $\varphi^4$ calculated for each pixel to the normal calculation unit 33.

The in-plane pixel selection unit 32 selects a plurality of pixels indicating the plane to be observed. In a similar manner to the first embodiment, the in-plane pixel selection unit 32 selects three or more in-plane pixels regarded as pixels in the normal calculation target plane from pixels within a predetermined range with respect to the normal calculation target pixel, and outputs, to the normal calculation unit 33, in-plane pixel information that enables the selected pixels to be discriminated.

The normal calculation unit 33 calculates a normal of the plane to be observed using the phase plane whose plane direction is the azimuth angle of the in-plane pixel selected by the in-plane pixel selection unit 32. For example, the normal calculation unit 33 calculates an intersection line of the phase planes between the pixels of the in-plane pixels selected by the in-plane pixel selection unit 32, and calculates the normal of the plane to be observed on the basis of the calculated intersection line. Specifically, on the basis of the candidate azimuth angles $\varphi^1$, $\varphi^2$, $\varphi^3$, and $\varphi^4$ in the in-plane pixel indicated by the in-plane pixel information supplied from the in-plane pixel selection unit 32, intersection lines between the in-plane pixels of the phase planes corresponding to the candidate azimuth angles are calculated, and the direction in which the intersection lines are concentrated is taken as the direction of the normal of the plane to be observed. Furthermore, the normal calculation unit 33 may calculate the intersection line of the phase planes of all the pixels of the in-plane pixels selected by the in-plane pixel selection unit 32, and may use the calculated intersection line as the normal of the plane to be observed.

In the case of the second embodiment, information indicating the azimuth angle is generated as the normal candidate information in the processing of step ST2 in the flowchart illustrated in FIG. 6. Furthermore, in the processing of step ST4, the normal of the plane to be observed is calculated on the basis of the intersection line between the in-plane pixels of the phase plane corresponding to the azimuth angle.

As described above, according to the second embodiment, it becomes possible to easily calculate a normal in which indeterminacy is cleared using an azimuth angle for each of a plurality of line-of-sight axes. In other words, it becomes possible to correctly calculate the normal of the plane to be observed. Furthermore, in a similar manner to the first embodiment, the normal of the plane to be observed can be correctly calculated even in a case where the polarization imaging unit 20 is provided in a mobile object. Furthermore, it is not required to provide a plurality of polarization imaging units.

4. Third Embodiment

Next, a third embodiment of the information processor 30 will be described. In the third embodiment, a case where a zenith angle and an azimuth angle are used as normal candidate information will be described.

FIG. 18 is a diagram for explaining a principle of the third embodiment. In the third embodiment, a principle of calculating a normal of a plane to be observed on the basis of a line-of-sight axis, a zenith angle, and an azimuth angle of each pixel of a plurality of pixels indicating the plane to be observed will be described. Note that an x-axis, a y-axis, and a z-axis represent a camera coordinate system, and for example, the x-axis is the horizontal direction of a polarization imaging unit 20, the y-axis is the perpendicular direction of the polarization imaging unit 20, and the z-axis is the optical axis direction of the polarization imaging unit 20.

Here, a candidate azimuth angle φi1 (0°≤φi1<90°) is defined as a candidate normal NCi1 at a zenith angle θi, a candidate azimuth angle φi2 (90°≤φi2<180°) is defined as a candidate normal NCi2 at the zenith angle θi, a candidate azimuth angle φi3 (180°≤φi3<270°) is defined as a candidate normal NCi3 at the zenith angle θi, and a candidate azimuth angle φi4 (270°≤φi4<360°) is defined as a candidate normal NCi4 at the zenith angle θi. In this case, since there is a plurality of candidates, a correct normal cannot be determined. In view of the above, the information processor 30 uses a plurality of line-of-sight axes. FIGS. 19A and 19B exemplify a case of using two line-of-sight axes. In a case where a line-of-sight axis vei and a line-of-sight axis vej are used, candidate normals NCj1 to NCj4 exist as illustrated in FIG. 19A. Therefore, the information processor 30 calculates, from candidate normals NCi1 to NCi4 for the line-of-sight axis vei of a pixel i and candidate normals NCj1 to NCj4 for the line-of-sight axis vej of a pixel j located around the pixel i, an angular difference dNC of the candidate normals for each combination of the candidate normals of the pixel i and the candidate normals of the pixel j. Furthermore, the information processor 30 calculates the normal of the plane to be observed from the candidate normals of the combination with the smallest angular difference dNCmin. The formula (20) is a formula for calculating a combination that produces the minimum angular difference dNCmin, a parameter Sp of the formula (20) is an index indicating the candidate normal of the line-of-sight axis vei in the combination that produces the minimum angular difference dNCmin, and a parameter Sq is an index indicating the candidate normal of the line-of-sight axis vej in the combination that produces the minimum angular difference dNCmin. As expressed in the formula (21), parameters p and q are any of "1" to "4".

[Numeral 8]

$$Sp, Sq = \underset{p,q}{\mathrm{argmin}}(NC_i^p - NC_j^q) \quad (20)$$

$$p, q = 1, 2, 3, 4 \quad (21)$$

Moreover, the information processor 30 calculates the normal of the plane to be observed on the basis of the candidate normals of the combination with the smallest angular difference dNCmin. The formula (22) exemplifies a formula for calculating an integrated normal $N_{ij}$ that integrates the candidate normals of the combination that produces the minimum angular difference dNCmin, and for example, the average of the candidate normals of the combination that produces the minimum angular difference dNCmin is taken as the integrated normal $N_{ij}$.

[Numeral 9]

$$N_{ij} = (Nc_i^{Sp} + NC_j^{Sq})/2 \quad (22)$$

Table 2 exemplifies the integrated normal for each combination of a plurality of line-of-sight axes.

TABLE 2

|  | $ve_1$ | $ve_2$ | $ve_3$ | ... | $ve_n$ |
|---|---|---|---|---|---|
| $ve_1$ | NONE | $NC_{12}$ | $NC_{13}$ | ... | $NC_{1n}$ |
| $ve_2$ | NONE | NONE | $NC_{23}$ | ... | $NC_{2n}$ |
| $ve_3$ | NONE | NONE | NONE | ... | $NC_{3n}$ |
| ... | NONE | NONE | NONE | ... | ... |
| $ve_n$ | NONE | NONE | NONE | ... | NONE |

The information processor 30 calculates a direction in which the integrated normals $N_{ij}$, which are calculated for each combination of the line-of-sight axes, are concentrated in a similar manner to the second embodiment, and the concentrated integrated normal is taken as the normal of the plane to be observed.

Furthermore, as illustrated in FIG. 19B, the candidate normals (candidate normals NCi1 and NCj1 in FIG. 19B) whose directions coincide with each other when the positions of the normal calculation target pixel and the in-plane pixels located in the periphery are made to coincide with each other may be taken as the normal of the plane to be observed.

FIG. 20 exemplifies a configuration of the third embodiment. The information processor 30 outputs, to the normal calculation unit 33, the zenith angle calculated by a zenith angle calculation unit 311 and the azimuth angle calculated by an azimuth angle calculation unit 312, which are provided in the normal candidate information generation unit 31, as normal candidate information.

The zenith angle calculation unit 311 calculates the zenith angle θ for each pixel on the basis of the polarization image obtained by the polarization imaging unit 20. The zenith angle calculation unit 311 calculates the polarization degree ρ from the minimum luminance Imin and the maximum luminance Imax as described above, and calculates the zenith angle θ for each pixel on the basis of the polarization degree ρ. The zenith angle calculation unit 311 outputs the zenith angle θ calculated for each pixel to the normal calculation unit 33.

The azimuth angle calculation unit 312 calculates an azimuth angle φ for each pixel on the basis of the polarization image obtained by the polarization imaging unit 20. The azimuth angle calculation unit 312 sets a polarization angle υ when the maximum luminance Imax is observed as described above as a candidate azimuth angle $φ^1$. Furthermore, angles that cause phase differences of 90°, 180°, and 270° with respect to the candidate azimuth angle $φ^1$ are set as candidate azimuth angles $φ^2$, $φ^3$, and $φ^4$. The azimuth angle calculation unit 312 outputs the candidate azimuth angles $φ^1$, $φ^2$, $φ^3$, and $φ^4$ calculated for each pixel to the normal calculation unit 33.

The in-plane pixel selection unit 32 selects a plurality of pixels indicating the plane to be observed. In a similar manner to the first embodiment, the in-plane pixel selection unit 32 selects a plurality of in-plane pixels (including the normal calculation target pixel) regarded as pixels in the normal calculation target plane from pixels within a predetermined range with respect to the normal calculation target pixel, and outputs, to the normal calculation unit 33, in-plane pixel information that enables the selected pixels to be discriminated.

The normal calculation unit 33 calculates a normal of the plane to be observed using the candidate normals indicated by the candidate azimuth angle and the zenith angle in the in-plane pixel indicated by the in-plane pixel information supplied from the in-plane pixel selection unit 32. The normal calculation unit 33 calculates an angular difference of the candidate normals between the pixels of the in-plane pixels selected by the in-plane pixel selection unit 32, and calculate the normal of the plane to be observed on the basis of the calculated angular difference. For example, the normal calculation unit 33 calculates the angular difference dNC for each combination of the candidate normals between the pixels of the in-plane pixels, and calculates the normal of the plane to be observed from the candidate normals of the combination that minimizes the angular difference dNC. Furthermore, the normal calculation unit 33 may set a candidate normal that is similar between pixels of the in-plane pixels as the normal of the plane to be observed.

In the case of the third embodiment, information indicating the zenith angle and the azimuth angle is generated as the normal candidate information in the processing of step ST2 in the flowchart illustrated in FIG. 6. Furthermore, in the processing of step ST4, the normal of the plane to be observed is calculated on the basis of the candidate normals based on the zenith angle and the azimuth angle.

As described above, according to the third embodiment, it becomes possible to easily calculate a normal in which indeterminacy is cleared using an azimuth angle and a zenith angle for each of a plurality of line-of-sight axes. In other words, it becomes possible to correctly calculate the normal of the plane to be observed. Furthermore, in a similar manner to the first embodiment, the normal of the plane to be observed can be correctly calculated even in a case where the polarization imaging unit 20 is provided in a mobile object. Furthermore, it is not required to provide a plurality of polarization imaging units.

5. Other Embodiments

Meanwhile, although the in-plane pixel selection unit 32 described above selects an in-plane pixel regarded as the same plane as the normal calculation target pixel i from neighboring pixels on the basis of the angular difference de between the line-of-sight axis of the normal calculation target pixel i and the line-of-sight axis of the neighboring pixel j and the angular difference do between the indeterminate normal of the normal calculation target pixel i and the indeterminate normal of the neighboring pixel j, the pixel selection is not limited to the method described above. For example, a non-polarization image may be generated from a polarization image to carry out edge detection, object recognition, and the like, and an in-plane pixel may be selected from an image area estimated to be on the same plane as the normal calculation target pixel.

Furthermore, in a case where a plurality of planes to be observed is included in the polarization image, the normal can be correctly calculated for each plane to be observed by performing the process of the embodiment described above for each plane to be observed. Furthermore, the polarization imaging unit 20 and the information processor 30 are not limited to the case of being separately provided, but the polarization imaging unit 20 and the information processor 30 may be integrally configured in such a manner that one of the polarization imaging unit 20 and the information processor 30 is included in the other one.

6. Applications

The technology according to the present disclosure can be applied to various fields. For example, the technology according to the present disclosure may be implemented as a device to be mounted on any type of mobile body such as a vehicle, electric vehicle, hybrid electric vehicle, motorcycle, bicycle, personal mobility, airplane, drone, ship, and robot. Furthermore, it may be implemented as a device to be mounted on equipment used in a production process in a factory or equipment used in the construction field. When applied to such fields, normal information of an object surface can be generated accurately. Therefore, the surrounding environment can be grasped accurately in three dimensions, and fatigue of a driver or a worker can be alleviated. Furthermore, autonomous driving and the like can be carried out more safely. The technology according to the present disclosure may be applied to the medical field and the like.

The series of processes described herein can be executed by hardware, software, or a combination of both of them. In a case where the processes are executed by software, a program in which a processing sequence is recorded is installed in a memory in a computer built in dedicated hardware, and is executed. Alternatively, the program can be installed in a general-purpose computer capable of executing various kinds of processing and executed.

For example, the program can be recorded in advance in a hard disk, a solid state drive (SSD), or a read only memory (ROM) as a recording medium. Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (BD (registered trademark)), a magnetic disk, and a semiconductor memory card. Such a removable recording medium can be provided as what is called package software.

Furthermore, the program may be installed in a computer from a removable recording medium, or may be transferred from a download site to a computer by wire or wirelessly via a network such as a local area network (LAN) and the Internet. The computer can receive the program transferred in such a manner and install it in a recording medium such as a built-in hard disk.

Note that the effects described herein are merely examples and are not limited, and there may be additional effects not described herein. Furthermore, the present technology should not be construed as being limited to the embodiments of the technology described above. The embodiments of the present technology disclose the present technology in a form of illustration, and it is obvious that those skilled in the art can modify or substitute the embodiments without departing from the gist of the present technology. That is, in order to determine the gist of the present technology, the scope of claims should be taken into consideration.

Furthermore, the information processing apparatus according to the present technology can also have the following configurations.

(1) An information processing apparatus including:
a normal candidate information generation unit that generates normal candidate information for each pixel on the basis of a polarization image in a plurality of polarization directions;
an in-plane pixel selection unit that selects a plurality of pixels indicating a plane to be observed in the polarization image; and
a normal calculation unit that calculates a normal of the plane to be observed on the basis of the normal candidate information of the pixels selected by the in-plane pixel selection unit.

(2) The information processing apparatus according to (1), in which the in-plane pixel selection unit selects three or more pixels.

(3) The information processing apparatus according to (1) or (2), in which the normal candidate information indicates a zenith angle, and
the normal calculation unit calculates the normal of the plane to be observed on the basis of a line-of-sight axis indicating a light beam direction from the plane to be observed corresponding to the pixel selected by the in-plane pixel selection unit toward a polarization imaging unit that has obtained the polarization image and the zenith angle of the pixel selected by the in-plane pixel selection unit.

(4) The information processing apparatus according to (1) or (2), in which the normal candidate information indicates an azimuth angle, and the normal calculation unit calculates the normal of the plane to be observed using a phase plane having the azimuth angle of the pixel selected by the in-plane pixel selection unit as a plane direction.

(5) The information processing apparatus according to (4), in which the normal calculation unit calculates an intersection line of the phase plane between the pixels selected by the in-plane pixel selection unit, and calculates the normal of the plane to be observed on the basis of the calculated intersection line.

(6) The information processing apparatus according to (4), in which the normal calculation unit calculates an intersection line of the phase plane of all the pixels selected by the in-plane pixel selection unit, and sets the intersection line as the normal of the plane to be observed.

(7) The information processing apparatus according to (1), in which the normal candidate information indicates a zenith angle and an azimuth angle, and the normal calculation unit calculates the normal of the plane to be observed using a candidate normal indicated by the zenith angle and the azimuth angle corresponding to the pixel selected by the in-plane pixel selection unit.

(8) The information processing apparatus according to (7), in which the normal calculation unit calculates an angular difference of the candidate normal between the pixels selected by the in-plane pixel selection unit, and calculates the normal of the plane to be observed on the basis of the calculated angular difference.

(9) The information processing apparatus according to (7), in which the normal calculation unit sets a candidate normal that is similar among all the pixels selected by the in-plane pixel selection unit as the normal of the plane to be observed.

(10) The information processing apparatus according to any one of (1) to (9), in which the in-plane pixel selection unit is configured to:

calculate an angular difference between line-of-sight axes of a first line-of-sight axis indicating a light beam direction from the plane to be observed corresponding to a normal calculation target pixel toward a polarization imaging unit that has obtained the polarization image and a second line-of-sight axis indicating a light beam direction from the plane to be observed corresponding to a neighboring pixel toward the polarization imaging unit that has obtained the polarization image;

calculate an angular difference between candidate normals of a candidate normal based on a polarization characteristic of the normal calculation target pixel calculated from the polarization image in a plurality of polarization directions and a candidate normal based on a polarization characteristic of the neighboring pixel; and select the neighboring pixel as a pixel indicating the plane to be observed on the basis of the angular difference between the line-of-sight axes and the angular difference between the candidate normals.

(11)
The information processing apparatus according to (10), in which in a case where the angular difference between the line-of-sight axes is larger than a threshold value set using the angular difference between the candidate normals, the in-plane pixel selection unit selects the neighboring pixel as the pixel indicating the plane to be observed.

(12) The information processing apparatus according to any one of (1) to (11), further including a polarization imaging unit that obtains the polarization image in the plurality of polarization directions indicating the plane to be observed.

INDUSTRIAL APPLICABILITY

According to the information processing apparatus, the method for processing information, and the program of the present technology, normal candidate information is generated for each pixel on the basis of a polarization image in a plurality of polarization directions, and a normal of a plane to be observed is calculated on the basis of the normal candidate information of a plurality of pixels indicating the plane to be observed in the polarization image. Accordingly, a normal in which indeterminacy is cleared can be easily calculated, whereby it is suitable for a device that performs various kinds of processing using a normal, which is, for example, a mobile device that recognizes a shape of an object using a normal and controls operation on the basis of a recognition result and the like.

REFERENCE SIGNS LIST

10 Information processing system
20 Polarization imaging unit
21 Image sensor
22 Polarization filter
30 Information processor
31 Normal candidate information generation unit
32 In-plane pixel selection unit
33 Normal calculation unit
41 Imaging unit
42 Polarizing plate
311 Zenith angle calculation unit
312 Azimuth angle calculation unit

The invention claimed is:

1. An information processing apparatus, comprising:
a computer with a processor and a memory configured to implement the following units:
a normal candidate information generation unit configured to generate normal candidate information for each pixel of a polarization image with a plurality of polarization directions based on the polarization image;
an in-plane pixel selection unit configured to select a plurality of pixels indicating a plane to be observed in the polarization image; and
a normal calculation unit configured to calculate a normal of the plane to be observed based on the normal candidate information of the plurality of pixels selected by the in-plane pixel selection unit.

2. The information processing apparatus according to claim 1, wherein the in-plane pixel selection unit is further configured to select three or more pixels of the plurality of pixels.

3. The information processing apparatus according to claim 1, wherein
the normal candidate information indicates a zenith angle, and
the normal calculation unit is further configured to calculate the normal of the plane to be observed based on line-of-sight axes corresponding to the selected plurality of pixels, wherein each line-of-sight axis indicates a light beam direction from its corresponding pixel on the plane to be observed toward a polarization imaging unit that has obtained the polarization image and zenith angles of the plurality of pixels selected by the in-plane pixel selection unit.

4. The information processing apparatus according to claim 1, wherein
the normal candidate information indicates an azimuth angle, and the normal calculation unit is further configured to calculate the normal of the plane to be observed using phase planes each having the azimuth angle of one pixel of the plurality of pixels selected by the in-plane pixel selection unit as a plane direction.

5. The information processing apparatus according to claim 4, wherein the normal calculation unit is further configured to:
calculate intersection lines each obtained from two phases corresponding, respectively, to two pixels of the plurality of pixels selected by the in-plane pixel selection unit; and
calculate the normal of the plane to be observed based on the calculated intersection lines.

6. The information processing apparatus according to claim 5, wherein the normal calculation unit is further configured to set a concentrated intersection line of the calculated intersection lines as the normal of the plane to be observed.

7. The information processing apparatus according to claim 1, wherein
the normal candidate information indicates a zenith angle and an azimuth angle, and
the normal calculation unit is further configured to calculate the normal of the plane to be observed based on a candidate normal indicated by zenith angles and azimuth angles corresponding to the plurality of pixels selected by the in-plane pixel selection unit.

8. The information processing apparatus according to claim 7, wherein the normal calculation unit is further configured to:
calculate angular differences each being based on candidate normals of two pixels of the plurality of pixels selected by the in-plane pixel selection unit; and
calculate the normal of the plane to be observed based on the calculated angular differences.

9. The information processing apparatus according to claim 8, wherein the normal calculation unit is further configured to set the normal of the plane to be observed based on the smallest of the calculated angular differences.

10. The information processing apparatus according to claim 1, wherein the in-plane pixel selection unit is further configured to:
calculate a first angular difference between a first line-of-sight axis indicating a light beam direction from a normal calculation target pixel toward a polarization imaging unit that has obtained the polarization image and a second line-of-sight axis indicating a light beam direction from a neighboring pixel of the normal calculation target pixel toward the polarization imaging unit;
calculate a second angular difference based on angular differences of pairs of normals having indeterminacy, wherein each pair consists of a normal having indeterminacy with respect to the normal calculation target pixel and a normal having indeterminacy with respect to the neighboring pixel; and
select the neighboring pixel as a pixel indicating the plane to be observed based on the first angular difference and the second angular difference.

11. The information processing apparatus according to claim 10, wherein
in a case where the first angular difference is larger than the second angular difference by a threshold value, the in-plane pixel selection unit is further configured to select the neighboring pixel as the pixel indicating the plane to be observed.

12. The information processing apparatus according to claim 1, further comprising:
a polarization imaging unit configured to obtain the polarization image in the plurality of polarization directions indicating the plane to be observed.

13. A method for processing information, comprising:
in a computer with a processor and a memory configured to implement the following units:
generating, using a normal candidate information generation unit, normal candidate information for each pixel of a polarization image with a plurality of polarization directions based on the polarization image;
selecting, using an in-plane pixel selection unit, a plurality of pixels indicating a plane to be observed in the polarization image; and
calculating, using a normal calculation unit, a normal of the plane to be observed based on the normal candidate information of the plurality of pixels selected by the in-plane pixel selection unit.

14. A non-transitory, computer-readable storage medium having stored thereon, computer executable instruction that when executed by a computer, causes the computer to execute instructions to calculate a normal of a plane to be observed, the instructions comprising:
generating normal candidate information for each pixel of a polarization image with a plurality of polarization directions based on the polarization image;
selecting a plurality of pixels indicating the plane to be observed in the polarization image; and
calculating the normal of the plane to be observed based on the normal candidate information of the selected plurality of pixels.

* * * * *